(12) United States Patent
Wu et al.

(10) Patent No.: US 11,265,897 B2
(45) Date of Patent: Mar. 1, 2022

(54) METHOD AND DEVICE IN USER EQUIPMENT AND BASE STATION FOR WIRELESS COMMUNICATION

(71) Applicants: Lu Wu, Shanghai (CN); XiaoBo Zhang, Shanghai (CN); Lin Yang, Shanghai (CN)

(72) Inventors: Lu Wu, Shanghai (CN); XiaoBo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 104 days.

(21) Appl. No.: 16/596,783

(22) Filed: Oct. 9, 2019

(65) Prior Publication Data
US 2020/0120696 A1 Apr. 16, 2020

(30) Foreign Application Priority Data
Oct. 12, 2018 (CN) .......................... 201811188975.6

(51) Int. Cl.
H04W 72/12 (2009.01)
H04L 5/00 (2006.01)

(52) U.S. Cl.
CPC ....... *H04W 72/1268* (2013.01); *H04L 5/0037* (2013.01); *H04L 5/0092* (2013.01);
(Continued)

(58) Field of Classification Search
CPC ......... H04W 72/1268; H04W 72/1289; H04W 72/1205; H04W 28/26; H04W 72/0446;
(Continued)

(56) References Cited

U.S. PATENT DOCUMENTS

2018/0049173 A1* 2/2018 Chen ................... H04W 72/044
2019/0037586 A1* 1/2019 Park ..................... H04L 1/0031
(Continued)

FOREIGN PATENT DOCUMENTS

CN 108702776 A * 10/2018

OTHER PUBLICATIONS

Huawei, HiSilicon, UL Multiplexing for URLLC, 3GPP TSG RAN WG1 Meeting #93, Busan, Korea, May 21-25, 2018, R1-1806893 (Year: 2018).*

(Continued)

*Primary Examiner* — Shailendra Kumar

(57) ABSTRACT

The discloses a method and device in a user equipment and a base station for wireless communication. The user equipment receives a first signaling, wherein the first signaling is used to determine a first time-frequency resource group, and the first time-frequency resource group is reserved for a first bit block; receives a second signaling, wherein the second signaling is used to determine a second time-frequency resource group, and the second time-frequency resource group is reserved for a second bit block; and transmits the first bit block and the second bit block in the second time-frequency resource group, or transmits only the second bit block. Time domain resource(s) occupied by the first time-frequency resource group and the second time-frequency resource group are non-orthogonal; a timing relationship between the first signaling and the second signaling is used to determine whether the first bit block is transmitted in the second time-frequency resource group.

16 Claims, 19 Drawing Sheets

(52) U.S. Cl.
CPC ... *H04W 72/1205* (2013.01); *H04W 72/1289* (2013.01); *H04L 5/0023* (2013.01)

(58) Field of Classification Search
CPC ... H04L 5/0037; H04L 5/0092; H04L 5/0023; H04L 5/0053; H04L 5/0094; H04L 5/0005
See application file for complete search history.

(56) References Cited

U.S. PATENT DOCUMENTS

2019/0098622 A1* 3/2019 Lee .................. H04W 72/0446
2019/0306923 A1* 10/2019 Xiong ................ H04W 72/042

OTHER PUBLICATIONS

Qualcomm Incorporated, Remaining issues for multiplexing UCI on PUSCH, 3GPP TSG RAN WG1 Meeting #92, Athens, Greece, Feb. 26-Mar. 2, 2018, R1-1802839 (Year: 2018).*
3rd Generation Partnership Project; Technical Specification Group Radio Access Network; NR; Multiplexing and channel coding (Release 15), 3GPP TS 38.212 V15.3.0 (Sep. 2018). (Year: 2018).*

* cited by examiner the second identifier is the same as the first identifier

Or the second identifier is different from the first identifier

FIG.13

METHOD AND DEVICE IN USER EQUIPMENT AND BASE STATION FOR WIRELESS COMMUNICATION

CROSS-REFERENCE TO RELATED APPLICATION

This application claims the priority benefit of Chinese Patent Application Serial Number 201811188975.6, filed on Oct. 12, 2018, the full disclosure of which is incorporated herein by reference.

BACKGROUND

Technical Field

The disclosure relates to a transmitting method and device in a wireless communication system, and in particular to a communication method and device for supporting data transmission on an unlicensed spectrum.

Related Art

In 5G systems, Enhance Mobile Broadband (eMBB) and Ultra Reliable and Low Latency Communication (URLLC) are two typical types of services. In the 3rd Generation Partner Project (3GPP) new air interface Release 15, a new Modulation and Coding Scheme (MCS) table has been defined for the lower target BLER requirement ($10^{-5}$) of the URLLC service.

In order to support the URLLC service with higher requirements, such as higher reliability (such as the target BLER of $10^{-6}$) and lower latency (such as 0.5-1 ms), etc., a URLLC enhanced Study Item (SI) of the new air interface Release 16 has passed in #80th plenary session of the 3rd Generation Partner Project (3GPP) Radio Access Network (RAN). The enhancement of Uplink Control Information (UCI) feedback is a key point to study.

SUMMARY

The inventors found through research that UCI comprises Hybrid Automatic Repeat reQuest (HARQ)/Channel State Information (CSI). When a Physical Uplink Control CHannel (PUCCH) is reserved for transmiting UCI is not orthogonal to a Physical Uplink Shared CHannel (PUSCH) in the time domain, how to transmit UCI is a key issue to be reconsidered in order to support transmission of higher reliability in the new air interface Release 16.

In view of the above problem, the disclosure discloses a solution. It should be noted that, in the case of no conflict, the embodiments of the disclosure and the features in the embodiments may be combined with each other arbitrarily.

The disclosure discloses a method in a user equipment for wireless communication, comprising:
  receiving a first signaling, wherein the first signaling is used to determine a first time-frequency resource group, and the first time-frequency resource group is reserved for a first bit block;
  receiving a second signaling, wherein the second signaling is used to determine a second time-frequency resource group, and the second time-frequency resource group is reserved for a second bit block; and
  transmitting the first bit block and the second bit block in the second time-frequency resource group, or transmitting only the second bit block among the first bit block and the second bit block in the second time-frequency resource group;
  wherein time domain resource(s) occupied by the first time-frequency resource group and time domain resource(s) occupied by the second time-frequency resource group are non-orthogonal; a timing relationship between the first signaling and the second signaling is used to determine whether the first bit block is transmitted in the second time-frequency resource group.

In one embodiment, the problem to be solved by the disclosure is how to enhance the transmission of UCI when the PUCCH is not orthogonal to the PUSCH in the time domain for the higher reliability requirement of the new air interface Release 16.

In one embodiment, the problem to be solved by the disclosure is that, in the existing standard, when the PUCCH reserved for transmitting the UCI is not orthogonal to the PUSCH in the time domain, the UCI is changed to be transmitted on the PUSCH. In the new air interface Release 16, a PUCCH reserved for transmitting a URLLC UCI has higher transmission reliability. When the PUCCH is not orthogonal to a PUSCH (such as eMBB service) in the time domain, if the existing standard method is used, the UCI is changed to be transmitted on the PUSCH. If the transmission quality of the PUSCH is not high enough, the transmission reliability of the UCI may not be guaranteed. Therefore, in order to support the higher reliability requirements of the new air interface Release 16, when PUCCH and PUSCH are not orthogonal in the time domain, how to transmit UCI is a key issue to be reconsidered.

In one embodiment, the problem to be solved by the disclosure is that, in the existing standard, when the PUCCH reserved for transmitting the UCI is not orthogonal to the PUSCH in the time domain, the UCI is changed to be transmitted on the PUSCH. In the new air interface Release 16, the URLLC PUSCH has higher transmission reliability. When the PUCCH reserved for transmitting UCI (eMBB/URLLC service) is not orthogonal to the URLLC PUSCH in the time domain, if the existing standard method is used, the UCI is changed to be transmitted on the URLLC PUSCH, and the transmission reliability of the URLLC PUSCH may not be guaranteed. Therefore, in order to support the higher reliability requirements of the new air interface Release 16, when PUCCH and PUSCH are not orthogonal in the time domain, how to transmit UCI is a key issue to be reconsidered.

In one embodiment, the method is characterized in that the first time-frequency resource group is a PUCCH, the second time-frequency resource group is a PUSCH, the first bit block is a UCI, and the second bit block is a Transport Block (TB). The PUCCH is not orthogonal to the PUSCH in the time domain, the first signaling triggers the UCI feedback, the second signaling triggers the PUSCH transmission, and it is determined whether the UCI is transmitted in the PUSCH according to the timing relationship between the first signaling and the second signaling.

According to an aspect of the disclosure, the method is characterized in that, when a start time for transmission of the first signaling is earlier than a start time for transmission of the second signaling, the first bit block and the second bit block are transmitted in the second time-frequency resource group; when the start time for transmission of the first signaling is later than the start time for transmission of the second signaling, only the second bit block among the first bit block and the second bit block is transmitted in the second time-frequency resource group.

In one embodiment, the above method has the advantage that, if the second signaling is transmitted earlier than the first signaling, the base station does not necessarily consider the UCI bearer when scheduling the PUSCH, and the transmission reliability of the UCI may not be guaranteed. In order to ensure that the transmission reliability of the UCI is not affected, the UCI is not transmitted in the PUSCH. If the second signaling is transmitted later than the first signaling, the base station may consider the UCI bearer when determining the scheduling information of the PUSCH, guaranteeing the transmission reliability of the UCI.

In one embodiment, the above method has the advantage that, if the second signaling is transmitted earlier than the first signaling, the base station does not necessarily consider the UCI bearer when scheduling the PUSCH. In order to ensure that the transmission reliability of the PUSCH is not affected, the UCI is not transmitted in the PUSCH. If the second signaling is transmitted later than the first signaling, the base station may consider the UCI bearer when determining the scheduling information of the PUSCH, guaranteeing the transmission reliability of the UCI.

According to an aspect of the disclosure, the above method is characterized by comprising:
receiving a first radio signal;
wherein the first signaling is further used to indicate scheduling information of the first radio signal, and the first bit block is used to indicate whether the first radio signal is correctly received.

According to an aspect of the disclosure, the method is characterized in that the first bit block is transmitted in the second time-frequency resource group, the second signaling comprises a first field, the first domain included in the second signaling is used to indicate a first parameter from a first parameter set, the first parameter is used to determine a number of time-frequency resource(s) occupied by the first bit block in the second time-frequency resource group; the first parameter belongs to the first parameter set, the first parameter set is one of Y candidate parameter sets, any one of the Y candidate parameter sets comprises a positive integer number of positive real numbers, and the Y is a positive integer.

According to an aspect of the disclosure, the method is characterized in that the Y is greater than 1, at least one of the Y candidate parameter sets comprises at least one positive real number less than 1, and each positive real number in at least one of the Y candidate parameter sets is not less than 1.

According to an aspect of the disclosure, the method is characterized in that the Y is greater than 1, the second signaling carries a second identifier, and the second identifier is used to determine the first parameter set in the Y candidate parameter sets;

According to an aspect of the disclosure, the method is characterized in that the Y is greater than 1, and time-frequency resource(s) occupied by the second signaling is(are) used to determine the first parameter set in the Y candidate parameter sets;

According to an aspect of the disclosure, the above method is characterized by comprising:
receiving first information;
wherein the first information is used to indicate the first parameter set.

According to an aspect of the disclosure, the above method is characterized by comprising:

receiving second information;
wherein the second information is used to indicate N time-frequency resource group sets, the N is a positive integer greater than 1, the first time-frequency resource group is a time-frequency resource group in a first time-frequency resource group set, and the first time-frequency resource group set is a time-frequency resource group set of the N time-frequency resource group sets; a number of bits included in the first bit block is used to determine the first time-frequency resource group set of the N time-frequency resource group sets.

The disclosure discloses a method in a base station for wireless communication, comprising:
transmitting a first signaling, wherein the first signaling is used to determine a first time-frequency resource group, and the first time-frequency resource group is reserved for a first bit block;
transmitting a second signaling, wherein the second signaling is used to determine a second time-frequency resource group, and the second time-frequency resource group is reserved for a second bit block; and
receiving the first bit block and the second bit block in the second time-frequency resource group, or receiving only the second bit block among the first bit block and the second bit block in the second time-frequency resource group;
wherein time domain resource(s) occupied by the first time-frequency resource group and time domain resource(s) occupied by the second time-frequency resource group are non-orthogonal; a timing relationship between the first signaling and the second signaling is used to determine whether the first bit block is transmitted in the second time-frequency resource group.

According to an aspect of the disclosure, the method is characterized in that, when a start time for transmission of the first signaling is earlier than a start time for transmission of the second signaling, the first bit block and the second bit block are received in the second time-frequency resource group; when the start time for transmission of the first signaling is later than the start time for transmission of the second signaling, only the second bit block among the first bit block and the second bit block is received in the second time-frequency resource group.

According to an aspect of the disclosure, the above method is characterized by comprising:
transmitting a first radio signal;
wherein the first signaling is further used to indicate scheduling information of the first radio signal, and the first bit block is used to indicate whether the first radio signal is correctly received.

According to an aspect of the disclosure, the method is characterized in that the first bit block is transmitted in the second time-frequency resource group, the second signaling comprises a first field, the first field included in the second signaling is used to indicate a first parameter from a first parameter set, the first parameter is used to determine a number of time-frequency resource(s) occupied by the first bit block in the second time-frequency resource group; the first parameter belongs to the first parameter set, the first parameter set is one of Y candidate parameter sets, any one of the Y candidate parameter sets comprises a positive integer number of positive real numbers, and the Y is a positive integer.

According to an aspect of the disclosure, the method is characterized in that the Y is greater than 1, at least one of the Y candidate parameter sets comprises at least one positive real number less than 1, and each positive real number in at least one of the Y candidate parameter sets is not less than 1.

According to an aspect of the disclosure, the method is characterized in that the Y is greater than 1, the second signaling carries a second identifier, and the second identifier is used to determine the first parameter set in the Y candidate parameter sets.

According to an aspect of the disclosure, the method is characterized in that the Y is greater than 1, and time-frequency resource(s) occupied by the second signaling is(are) used to determine the first parameter set in the Y candidate parameter sets.

According to an aspect of the disclosure, the above method is characterized by comprising:
transmitting first information;
wherein the first information is used to indicate the first parameter set.

According to an aspect of the disclosure, the above method is characterized by comprising:
transmitting second information;
wherein the second information is used to indicate N time-frequency resource group sets, the N is a positive integer greater than 1, the first time-frequency resource group is a time-frequency resource group in a first time-frequency resource group set, and the first time-frequency resource group set is a time-frequency resource group set of the N time-frequency resource group sets; a number of bit(s) included in the first bit block is used to determine the first time-frequency resource group set of the N time-frequency resource group sets.

The disclosure discloses a user equipment for wireless communication, comprising:
a first receiver receiving a first signaling, wherein the first signaling is used to determine a first time-frequency resource group, and the first time-frequency resource group is reserved for a first bit block; receiving a second signaling, wherein the second signaling is used to determine a second time-frequency resource group, and the second time-frequency resource group is reserved for a second bit block; and
a first transmitter transmitting the first bit block and the second bit block in the second time-frequency resource group, or transmitting only the second bit block among the first bit block and the second bit block in the second time-frequency resource group;
wherein time domain resource(s) occupied by the first time-frequency resource group and time domain resource(s) occupied by the second time-frequency resource group are non-orthogonal; a timing relationship between the first signaling and the second signaling is used to determine whether the first bit block is transmitted in the second time-frequency resource group.

The disclosure discloses a base station for wireless communication, comprising:
a second transmitter transmitting a first signaling, wherein the first signaling is used to determine a first time-frequency resource group, and the first time-frequency resource group is reserved for a first bit block; transmitting a second signaling, wherein the second signaling is used to determine a second time-frequency resource group, and the second time-frequency resource group is reserved for a second bit block; and
a second receiver receiving the first bit block and the second bit block in the second time-frequency resource group, or receiving only the second bit block among the first bit block and the second bit block in the second time-frequency resource group;
wherein time domain resource(s) occupied by the first time-frequency resource group and time domain resource(s) occupied by the second time-frequency resource group are non-orthogonal; a timing relationship between the first signaling and the second signaling is used to determine whether the first bit block is transmitted in the second time-frequency resource group.

In one embodiment, the disclosure has the following advantages compared with the conventional solution.

In the existing standard, when the PUCCH reserved for transmitting the UCI is not orthogonal to the PUSCH in the time domain, the UCI is changed to be transmitted on the PUSCH. In the new air interface Release 16, a PUCCH reserved for transmitting a URLLC UCI has higher transmission reliability. When the PUCCH is not orthogonal to a PUSCH (such as eMBB service) in the time domain, if the existing standard method is used, the UCI is changed to be transmitted on the PUSCH. If the transmission quality of the PUSCH is not high enough, the transmission reliability of the UCI may not be guaranteed. The disclosure solves the problem of how to transmit UCI when the PUCCH and the PUSCH are not orthogonal in the time domain in the support of the higher reliability requirements of the new air interface Release 16.

In the existing standard, when the PUCCH reserved for transmitting the UCI is not orthogonal to the PUSCH in the time domain, the UCI is changed to be transmitted on the PUSCH. In the new air interface Release 16, the URLLC PUSCH has higher transmission reliability. When the PUCCH reserved for transmitting UCI (eMBB/URLLC service) is not orthogonal to the URLLC PUSCH in the time domain, if the existing standard method is used, the UCI is changed to be transmitted on the URLLC PUSCH, and the transmission reliability of the URLLC PUSCH may not be guaranteed. The disclosure solves the problem of how to transmit UCI when the PUCCH and the PUSCH are not orthogonal in the time domain in the support of the higher reliability requirements of the new air interface Release 16.

When a PUCCH reserved for transmitting a URLLC UCI is not orthogonal to the PUSCH in the time domain, the disclosure determines whether the UCI is transmitted in the PUSCH according to the timing relationship between the PUSCH trigger signaling and the UCI trigger signaling to ensure that the new air interface Release 16 has higher reliability requirements for the URLLC UCI.

When a PUCCH reserved for transmitting a UCI is not orthogonal to the URLLC PUSCH in the time domain, the disclosure determines whether the UCI is transmitted in the PUSCH according to the timing relationship between the PUSCH trigger signaling and the UCI trigger signaling to ensure that the new air interface Release 16 has higher reliability requirements for the URLLC PUSCH.

BRIEF DESCRIPTION OF THE DRAWINGS

Other features, objects and advantages of the disclosure will become more apparent from the detailed description of non-restrictive embodiments taken in conjunction with the following drawings.

FIG. 13 is a schematic diagram illustrating a relationship between a first identifier and a second identifier according to one embodiment of the disclosure;

DESCRIPTION OF THE EMBODIMENTS

The technical schemes of the present disclosure will be further described in detail below with reference to the accompanying drawings. It should be noted that the embodiments of the disclosure and the features in the embodiments may be combined with each other arbitrarily without conflict.

Embodiment 1

Figure 1:
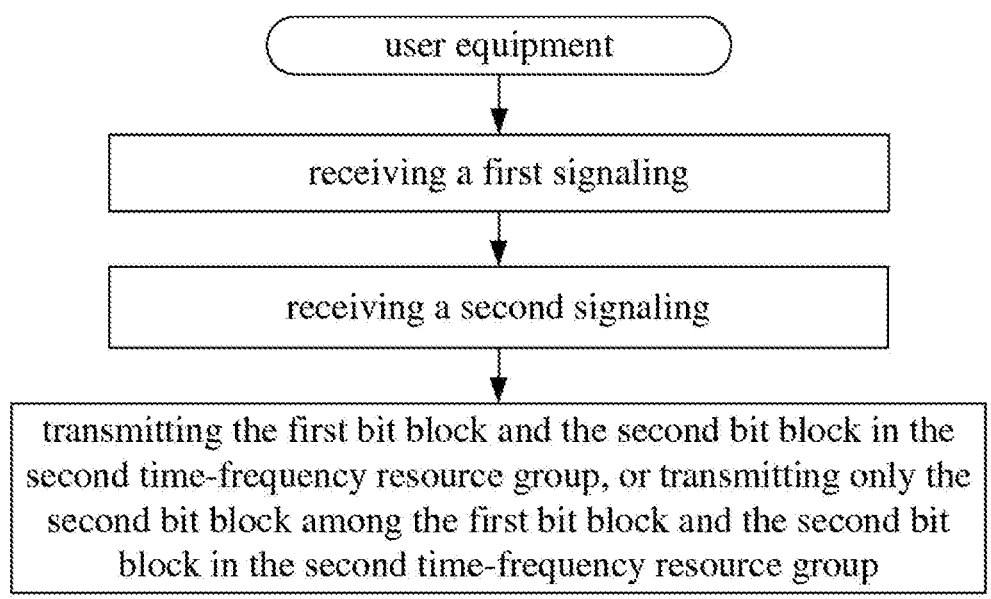
FIG. 1 is a flow diagram illustrating first signaling, second signaling, and a first bit block according to one embodiment of the disclosure.

Embodiment 1 illustrates a flow diagram illustrating first signaling, second signaling, a first bit block, and a second bit block, as shown in FIG. 1.

In Embodiment 1, the user equipment in the disclosure receives a first signaling, wherein the first signaling is used to determine a first time-frequency resource group, and the first time-frequency resource group is reserved for a first bit block; receives a second signaling, wherein the second signaling is used to determine a second time-frequency resource group, and the second time-frequency resource group is reserved for a second bit block; and transmits the first bit block and the second bit block in the second time-frequency resource group, or transmits only the second bit block among the first bit block and the second bit block in the second time-frequency resource group; wherein time domain resource(s) occupied by the first time-frequency resource group and time domain resource(s) occupied by the second time-frequency resource group are non-orthogonal; a timing relationship between the first signaling and the second signaling is used to determine whether the first bit block is transmitted in the second time-frequency resource group.

In one embodiment, the first time-frequency resource group is reserved for transmission of the first bit block.

In one embodiment, the second time-frequency resource group is reserved for transmission of the second bit block.

In one embodiment, the first time-frequency resource group is time-frequency resource(s) belonging to an uplink physical layer control channel (i.e., an uplink channel that can only be used to carry physical layer signaling).

In one sub-embodiment of the above embodiment, the uplink physical layer control channel is a Physical Uplink Control CHannel (PUCCH).

In one sub-embodiment of the above embodiment, the uplink physical layer control channel is a short PUCCH (sPUCCH).

In one sub-embodiment of the above embodiment, the uplink physical layer control channel is a New Radio PUCCH (NR-PUCCH).

In one sub-embodiment of the above embodiment, the uplink physical layer control channel is a Narrow Band PUCCH (NB-PUCCH).

In one embodiment, the second time-frequency resource group is time-frequency resource(s) belonging to an Uplink Shared Channel (UL-SCH).

In one embodiment, the second time-frequency resource group is time-frequency resource(s) belonging to an uplink physical layer data channel (i.e., an uplink channel that can be used to carry physical layer data).

In one sub-embodiment of the above embodiment, the uplink physical layer data channel is a Physical Uplink Shared CHannel (PUSCH).

In one sub-embodiment of the above embodiment, the uplink physical layer data channel is a short PUSCH (sPUSCH).

In one sub-embodiment of the above embodiment, the uplink physical layer data channel is a New Radio PUSCH (NR-PUSCH).

In one sub-embodiment of the above embodiment, the uplink physical layer data channel is a Narrow Band PUSCH (NB-PUSCH).

In one embodiment, the first time-frequency resource group comprises a positive integer number of Resource Elements (REs).

In one embodiment, the first time-frequency resource group comprises a positive integer number of multi-carrier symbols in the time domain, and the first time-frequency resource group comprises a positive integer number of sub-carriers in the frequency domain.

In one embodiment, the second time-frequency resource group comprises a positive integer number of REs.

In one embodiment, the second time-frequency resource group comprises a positive integer number of multi-carrier symbols in the time domain, and the second time-frequency resource group comprises a positive integer number of sub-carriers in the frequency domain.

In one embodiment, the time domain resource(s) occupied by the first time-frequency resource group and the time domain resource(s) occupied by the second time-frequency resource group are overlapped.

In one embodiment, both the time domain resource(s) occupied by the first time-frequency resource group and the time domain resource(s) occupied by the second time-frequency resource group comprise at least one identical multi-carrier symbol.

In one embodiment, both the time domain resource(s) occupied by the first time-frequency resource group and the time domain resource(s) occupied by the second time-frequency resource group belong to a first time window.

In one sub-embodiment of the above embodiment, the first time window comprises one slot.

In one sub-embodiment of the above embodiment, the first time window comprises one subframe.

In one sub-embodiment of the above embodiment, the first time window comprises a plurality of slots.

In one sub-embodiment of the above embodiment, the first time window comprises a plurality of subframes.

In one sub-embodiment of the above embodiment, the first time window comprises a positive integer number of multi-carrier symbols.

In one embodiment, the frequency domain resource(s) occupied by the first time-frequency resource group and the frequency domain resource(s) occupied by the second time-frequency resource group are orthogonal.

In one sub-embodiment of the above embodiment, the frequency domain resource(s) occupied by the first time-frequency resource group and the frequency domain resource(s) occupied by the second time-frequency resource group are not overlapped.

In one sub-embodiment of the above embodiment, any one sub-carrier of the frequency domain resource(s) occupied by the first time-frequency resource group does not belong to the frequency domain resource(s) occupied by the second time-frequency resource group.

In one embodiment, the frequency domain resource(s) occupied by the first time-frequency resource group and the frequency domain resource(s) occupied by the second time-frequency resource group are non-orthogonal.

In one sub-embodiment of the above embodiment, the frequency domain resource(s) occupied by the first time-frequency resource group and the frequency domain resource(s) occupied by the second time-frequency resource group are overlapped.

In one sub-embodiment of the above embodiment, both the frequency domain resource(s) occupied by the first time-frequency resource group and the frequency domain resource(s) occupied by the second time-frequency resource group comprise at least one identical sub-carrier.

In one embodiment, the multi-carrier symbol is an Orthogonal Frequency Division Multiplexing (OFDM) symbol.

In one embodiment, the multi-carrier symbol is a Single Carrier-Frequency Division Multiple Access (SC-FDMA) symbol.

In one embodiment, the multi-carrier symbol is a Discrete Fourier Transform Spread OFDM (DFT-S-OFDM) symbol.

In one embodiment, the multi-carrier symbol is a Filter Bank Multi Carrier (FBMC) symbol.

In one embodiment, the multi-carrier symbol comprises a Cyclic Prefix (CP).

In one embodiment, the first signaling is dynamically configured.

In one embodiment, the first signaling is physical layer signaling.

In one embodiment, the first signaling is Downlink Control Information (DCI) signaling.

In one embodiment, the first signaling is downlink granted DCI signaling.

In one embodiment, the first signaling is transmitted on a downlink physical layer control channel (i.e., a downlink channel that can only be used to carry physical layer signaling).

In one sub-embodiment of the above embodiment, the downlink physical layer control channel is a Physical Downlink Control CHannel (PDCCH).

In one sub-embodiment of the above embodiment, the downlink physical layer control channel is a short PDCCH (sPDCCH).

In one sub-embodiment of the above embodiment, the downlink physical layer control channel is a New Radio PDCCH (NR-PDCCH).

In one sub-embodiment of the above embodiment, the downlink physical layer control channel is a Narrow Band PDCCH (NB-PDCCH).

In one embodiment, the first signaling is transmitted on a downlink physical layer data channel (i.e., a downlink channel that can be used to carry physical layer data).

In one sub-embodiment of the above embodiment, the downlink physical layer data channel is a PDSCH (Physical Downlink Shared CHannel).

In one sub-embodiment of the above embodiment, the downlink physical layer data channel is a short PDSCH (sPDSCH).

In one sub-embodiment of the above embodiment, the downlink physical layer data channel is a New Radio PDSCH (NR-PDSCH).

In one sub-embodiment of the above embodiment, the downlink physical layer data channel is a Narrow Band PDSCH (NB-PDSCH).

In one embodiment, the first signaling is DCI format 1_0, and the specific definition of the DCI format 1_0 is described in section 7.3.1.2 of 3GPP TS38.212.

In one embodiment, the first signaling is DCI format 1_1, and the specific definition of the DCI format 1_1 is described in section 7.3.1.2 of 3GPP TS38.212.

In one embodiment, the first bit block comprises a positive integer number of bits.

In one embodiment, the first bit block carries a Hybrid Automatic Repeat reQuest ACKnowledgement (HARQ-ACK) feedback.

In one embodiment, some bits of the first bit block carry the HARQ-ACK feedback.

In one embodiment, all bits of the first bit block carry the HARQ-ACK feedback.

In one embodiment, the second signaling is dynamically configured.

In one embodiment, the second signaling is physical layer signaling.

In one embodiment, the second signaling is DCI signaling.

In one embodiment, the second signaling is uplink granted DCI signaling.

In one embodiment, the second signaling is transmitted on a downlink physical layer control channel (i.e., a downlink channel that can only be used to carry physical layer signaling).

In one sub-embodiment of the above embodiment, the downlink physical layer control channel is a PDCCH.

In one sub-embodiment of the above embodiment, the downlink physical layer control channel is an sPDCCH.

In one sub-embodiment of the above embodiment, the downlink physical layer control channel is an NR-PDCCH.

In one sub-embodiment of the above embodiment, the downlink physical layer control channel is an NB-PDCCH.

In one embodiment, the second signaling is transmitted on a downlink physical layer data channel (i.e., a downlink channel that can be used to carry physical layer data).

In one sub-embodiment of the above embodiment, the downlink physical layer data channel is a PDSCH.

In one sub-embodiment of the above embodiment, the downlink physical layer data channel is an sPDSCH.

In one sub-embodiment of the above embodiment, the downlink physical layer data channel is an NR-PDSCH.

In one sub-embodiment of the above embodiment, the downlink physical layer data channel is an NB-PDSCH.

In one embodiment, the second signaling is DCI format 0_0, and the specific definition of the DCI format 0_0 is described in section 7.3.1.1 of 3GPP TS38.212.

In one embodiment, the second signaling is DCI format 0_1, and the specific definition of the DCI format 0_1 is described in section 7.3.1.1 of 3GPP TS38.212.

In one embodiment, the second signaling comprises a second field and a third field, and the second field and the third field included in the second signaling are used to indicate the second time-frequency resource group.

In one sub-embodiment of the above embodiment, the second field included in the second signaling comprises a positive integer number of bits, and the third field included in the second signaling comprises a positive integer number of bits.

In one sub-embodiment of the above embodiment, the second field included in the second signaling is used to indicate frequency domain resource(s) occupied by the second time-frequency resource group.

In one sub-embodiment of the above embodiment, the second field included in the second signaling explicitly indicates frequency domain resource(s) occupied by the second time-frequency resource group.

In one sub-embodiment of the above embodiment, the second field included in the second signaling implicitly indicates frequency domain resource(s) occupied by the second time-frequency resource group.

In one sub-embodiment of the above embodiment, the third field included in the second signaling is used to indicate time domain resource(s) occupied by the second time-frequency resource group.

In one sub-embodiment of the above embodiment, the third field included in the second signaling explicitly indicates time domain resource(s) occupied by the second time-frequency resource group.

In one sub-embodiment of the above embodiment, the third field included in the second signaling implicitly indicates time domain resource(s) occupied by the second time-frequency resource group.

In one sub-embodiment of the above embodiment, the second field and the third field included in the second signaling are a frequency domain resource assignment and a time domain resource assignment, respectively, and the specific definition of the frequency domain resource assignment and the time domain resource assignment is described in section 6.1.2 of 3GPP TS38.214.

In one embodiment, the second bit block comprises a Transport Block (TB).

In one embodiment, a Transport Block (TB) is sequentially subjected to CRC insertion, channel coding, rate matching, scrambling, modulation, layer mapping, precoding, mapping to resource element, OFDM baseband signal generation, modulation and upconversion so as to obtain a radio signal for transmitting the transport block.

In one embodiment, a Transport Block (TB) is sequentially subjected to CRC insertion, channel coding, rate matching, scrambling, modulation, layer mapping, precoding, mapping to virtual resource blocks, mapping from virtual to physical resource blocks, OFDM baseband signal generation, modulation and upconversion so as to obtain a radio signal for transmitting the transport block.

In one embodiment, a Transport Block (TB) is sequentially subjected to CRC Insertion, Segmentation, coding block-level CRC Insertion, channel coding, rate matching, concatenation, scrambling, modulation, layer mapping, precoding, mapping to resource element, OFDM baseband signal generation, modulation and upconversion so as to obtain a radio signal for transmitting the transport block.

In one embodiment, the timing relationship between the first signaling and the second signaling refers to a transmitting sequence of the first signaling and the second signaling in a time domain.

In one embodiment, the timing relationship between the first signaling and the second signaling refers to a sequential transmission relationship between the first signaling and the second signaling in a time domain.

In one embodiment, only the second bit block among the first bit block and the second bit block is transmitted t in the second time-frequency resource group, and the first bit block is not transmitted in the first time-frequency resource group.

In one embodiment, only the second bit block among the first bit block and the second bit block is transmitted in the second time-frequency resource group, the first bit block is transmitted in the third time-frequency resource group, and the time domain resource(s) occupied by the third time-frequency resource group and the time domain resource(s) occupied by the second time-frequency resource group are orthogonal.

In one embodiment, only the second bit block among the first bit block and the second bit block is transmitted in the second time-frequency resource group, a second time-frequency resource sub-group is formed by all the time-frequency resource(s) used for transmitting the second bit block in the second time-frequency resource group, the first bit block is transmitted in the third time-frequency resource group, and the time domain resource(s) occupied by the third time-frequency resource group and the time domain resource(s) occupied by the second time-frequency resource group are orthogonal.

Embodiment 2

Figure 2:
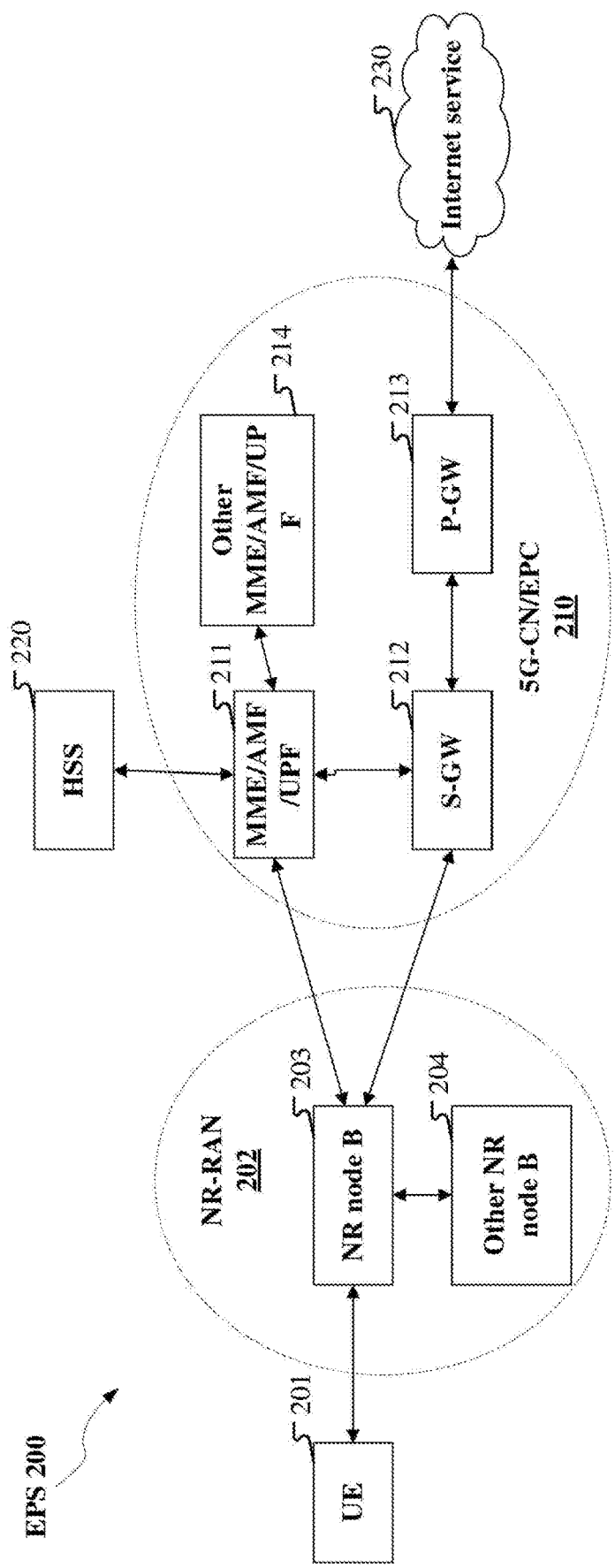
FIG. 2 is a schematic diagram illustrating a network architecture according to one embodiment of the disclosure.

Embodiment 2 illustrates a schematic diagram of a network architecture, as shown in FIG. 2.

Embodiment 2 illustrates a schematic diagram of a network architecture according to the present disclosure, as shown in FIG. 2. FIG. 2 illustrates a diagram of a system network architecture 200 of NR 5G, Long-Term Evolution (LTE), and Long-Term Evolution Advanced (LTE-A). The NR 5G or LTE network architecture 200 may be referred to as an Evolved Packet System (EPS) 200 or other appropriate terms. The EPS 200 may include one or more of a User Equipment (UE) 201, a Next Generation Radio Access Network (NG-RAN) 202, an Evolved Packet Core (EPC)/5G-Core Network (5G-CN) 210, a Home Subscriber Server (HSS) 220 and an Internet Service 230. The EPS may be interconnected with other access networks. For simple description, the entities/interfaces are not shown. As shown in the figure, the EPS provides packet switching services. Those skilled in the art are easy to understand that various concepts presented throughout the present disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a Transmitter Receiver Point (TRP) or other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), Satellite Radios, non-terrestrial base station communication, satellite mobile communication, Global Positioning Systems, multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or other appropriate terms. The gNB 203 is connected to the EPC/5G-CN 210 via an S1/NG interface. The EPC/5G-CN 210 includes an MME/AMF/UPF 211, other Mobility Management Entity (MME)/Authentication Management Field (AMF)/User Plane Function (UPF) 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IP IMSs) and Packet Switching Streaming Services (PSSs).

In one embodiment, the UE 201 corresponds to the user equipment in the disclosure.

In one embodiment, the gNB 203 corresponds to the base station in the disclosure.

In one sub-embodiment, the UE 201 supports wireless communication for MIMO.

In one sub-embodiment, the gNB 203 supports wireless communication for MIMO.

Embodiment 3

Figure 3:
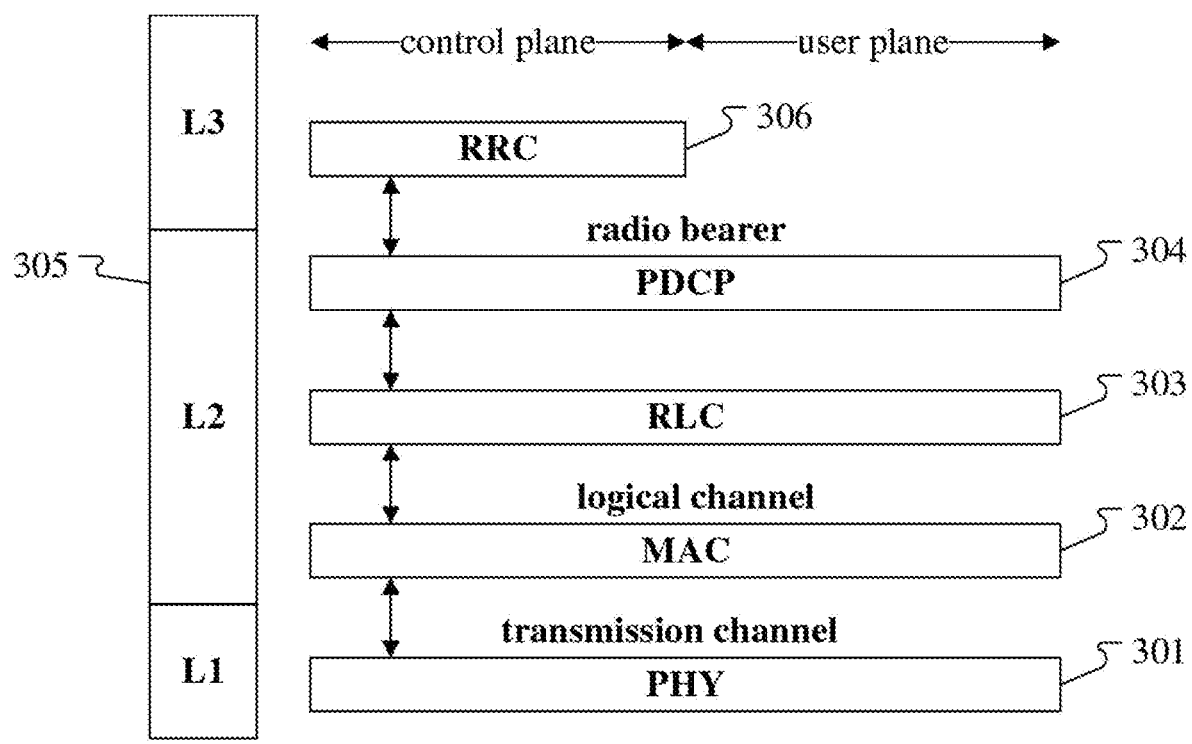
FIG. 3 is a schematic diagram illustrating a radio protocol architecture of a user plane and a control plane according to one embodiment of the disclosure

Embodiment 3 illustrates a schematic diagram of a radio protocol architecture of a user plane and a control plane according to the present disclosure, as shown in FIG. 3.

FIG. 3 illustrates a schematic diagram of a radio protocol architecture of a user plane and a control plane. In FIG. 3, the radio protocol architecture of a user equipment (UE) and Base Station (gNB or eNB) is represented by three layers, which are a layer 1, a layer 2 and a layer 3 respectively. The layer 1 (L1) 301 is the lowest layer and performs signal processing functions of each PHY layer. The layer 1 is called PHY 301 in this paper. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers terminate at the gNB of the network side. Although not described in FIG. 3, the UE may include several higher-layers above the L2 305, such as a network layer (i.e. IP layer) terminated at a P-GW of the network side and an application layer terminated at the other side of the connection (i.e. a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a lost packet to as to compensate the disordered receiving caused by Hybrid Automatic Repeat Request (HARQ). The MAC sublayer 302 provides multiplexing between logical channels and transmission channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression function for the control plane. The control plane also includes a Radio Resource Control (RRC) sublayer 306 in the layer 3 (L3). The RRC sublayer 306 is responsible for acquiring radio resources (i.e. radio bearer) and configuring the lower layers using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the second information in the disclosure is generated by the RRC sublayer 306.

In one embodiment, the first signaling in the disclosure is generated by the PHY 301.

In one embodiment, the first radio signal in the disclosure is generated by the PHY 301.

In one embodiment, the first information in the disclosure is generated by the RRC sublayer 306.

In one embodiment, the second signaling in the disclosure is generated by the PHY 301.

In one embodiment, a radio signal carrying the first bit block in the disclosure is generated by the PHY 301.

In one embodiment, a radio signal carrying the second bit block in the disclosure is generated by the PHY 301.

In one embodiment, the third information in the disclosure is generated by the RRC sublayer 306.

Embodiment 4

Figure 4:
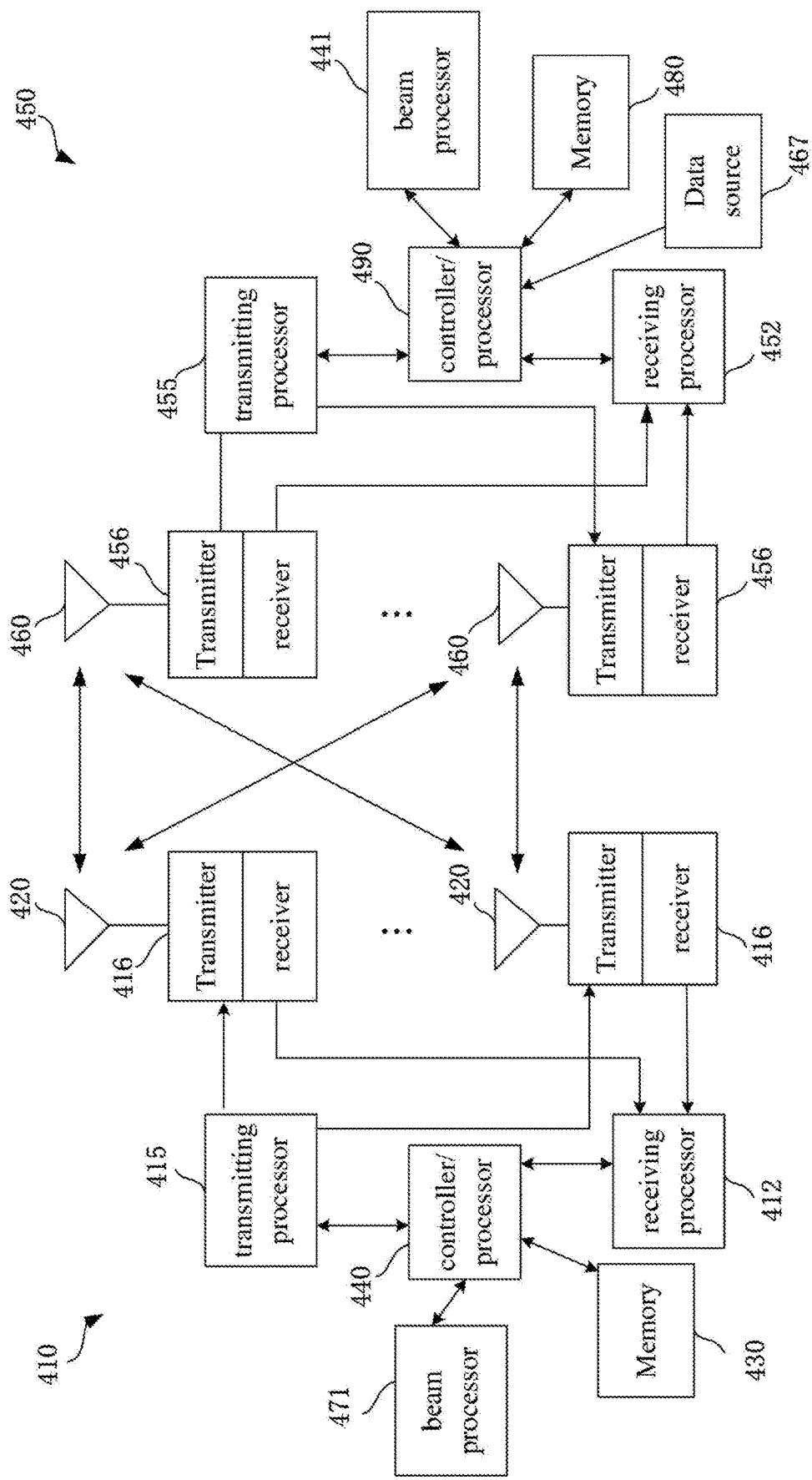
FIG. 4 is a schematic diagram illustrating an New Radio (NR) node and a UE according to one embodiment of the disclosure.

Embodiment 4 shows a schematic diagram of a base station and a user equipment according to the present disclosure, as shown in FIG. 4. FIG. 4 is a block diagram of a gNB 410 in communication with UE 450 in an access network.

The base station (410) comprises a controller/processor 440, a memory 430, a receiving processor 412, a beam processor 471, a transmitting processor 415, a transmitter/receiver 416 and an antenna 420.

The user equipment (450) comprises a controller/processor 490, a memory 480, a data source 467, a beam processor 441, a transmitting processor 455, a receiving processor 452, a transmitter/receiver 456, and an antenna 460.

In downlink transmission, the processing related to the base station (410) comprises:
- a controller/processor 440, wherein the upper layer packet arrives, the controller/processor 440 provides packet header compression, encryption, packet segmentation and reordering, and multiplexing and demultiplexing between the logical and transmission channels for implementing the L2 layer protocol for the user plane and the control plane; the upper-layer packet may include data or control information, such as a Downlink Shared Channel (DL-SCH);
- the controller/processor 440, which is associated with a memory 430 in which program codes and data are stored, wherein the memory 430 may be a computer-readable medium;
- the controller/processor 440 comprising a scheduling unit for transmitting a demand, wherein the scheduling unit schedules air interface resources corresponding to the transmission demand;
- a beam processor 471, which determines the first signaling and the second signaling;
- the transmitting processor 415, which receives the bit stream output by the controller/processor 440, and implements various signal transmission processing functions for the L1 layer (i.e., the physical layer) including coding, interleaving, scrambling, modulating, power control/allocation, and generation of physics layer control signaling (including a PBCH, a PDCCH, a PHICH, a PCFICH, a reference signal), etc.;
- the transmitting processor 415, which receives the bit stream output by the controller/processor 440, and implements various signal transmission processing functions for the L1 layer (i.e., the physical layer) including multi-antenna transmission, spreading, code division multiplexing, precoding, etc.;
- the transmitter 416, which converts the baseband signals provided by the transmitting processor 415 into radio frequency signals and transmit the signals via the antenna 420; each transmitter 416 samples the respective input symbol streams to obtain respective sampled signal streams; each transmitter 416 performs further processing (such as digital to analog conversion, amplification, filtering, upconversion, etc.) on the respective sampling streams to obtain downlink signals.

In the downlink transmission, the processing related to the user equipment (450) may comprise:
- a receiver 456, which converts the radio frequency signal received through the antenna 460 into a baseband signal and provides the baseband signal to the receiving processor 452;
- a receiving processor 452, which implements various signal reception processing functions for the L1 layer (i.e., the physical layer) including decoding, deinterleaving, descrambling, demodulating, and physical layer control signaling extraction, etc.;
- a receiving processor 452, which implements various signal reception processing functions for the L1 layer (i.e., the physical layer) including multi-antenna receiving, despreading, code division multiplexing, precoding, etc.;
- a beam processor 441, which determines the first signaling and the second signaling;
- a controller/processor 490, which receives the bit stream output by the receiving processor 452, and provides packet header decompression, decryption, packet segmentation and reordering, and multiplexing and demultiplexing between the logical and transmission channels for implementing the L2 layer protocol for the user plane and the control plane;
- the controller/processor 490, which is associated with a memory 480 in which program codes and data are stored, wherein the memory 480 may be a computer-readable medium.

In Uplink (UL) transmission, the processing related to the base station (410) comprises:
- a receiver 416, which receives a radio frequency signal through its corresponding antenna 420, converts the received radio frequency signal into a baseband signal and provides the baseband signal to the receiving processor 412;
- a receiving processor 412, which implements various signal reception processing functions for the L1 layer (i.e., the physical layer) including decoding, deinterleaving, descrambling, demodulating, and physical layer control signaling extraction, etc.;
- a receiving processor 412, which implements various signal reception processing functions for the L1 layer (i.e., the physical layer) including multi-antenna receiving, despreading, code division multiplexing, precoding, etc.;
- a controller/processor 440, which implements L2 layer functions and is associated with a memory 430 in which program codes and data are stored;
- the controller/processor 440, which provides demultiplexing between the transport and logical channels, packet reassembly, decryption, header decompression, and control signal processing to recover upper layer packets from UE 450; the upper layer packets from the controller/processor 440 can be provided to the core network;
- a beam processor 471, which determines to receive the first bit block and the second bit block in the second time-frequency resource group, or to receive only the second bit block among the first bit block and the second bit block in the second time-frequency resource group.

In Uplink (UL) transmission, the processing related to the user equipment (450) comprises:

a data source 467, which provides the upper layer packet to a controller/processor 490, wherein the data source 467 represents all protocol layers above the L2 layer;

a transmitter 456, which transmits a radio frequency signal through its corresponding antenna 460, converts the baseband signal into a radio frequency signal, and provides the radio frequency signal to the corresponding antenna 460;

a transmitting processor 455, which is configured to implement various signal reception processing functions for the L1 layer (i.e., the physical layer) including coding, interleaving, scrambling, modulation, and physical layer signaling generation, etc.;

a transmitting processor 455, which implements various signal reception processing functions for the L1 layer (i.e., the physical layer) including multi-antenna transmission, spreading, code division multiplexing, precoding, etc.;

a controller/processor 490, which implements header compression, encryption, packet segmentation and reordering, and multiplexing between logical and transmission channels based on radio resource allocation of gNB 410 for implementing the L2 layer function for the user plane and the control plane;

the controller/processor 490, which is also responsible for HARQ operations, retransmission of lost packets, and signaling to the gNB 410;

a beam processor 441, which determines to transmit the first bit block and the second bit block in the second time-frequency resource group, or to transmit only the second bit block among the first bit block and the second bit block in the second time-frequency resource group.

In one embodiment, the UE 450 device comprises: at least one processor and at least one memory, wherein the at least one memory includes a computer program code; the at least one memory and the computer program code are used together with the at least one processor. The UE 450 device at least: receives a first signaling, wherein the first signaling is used to determine a first time-frequency resource group, and the first time-frequency resource group is reserved for a first bit block; receives a second signaling, wherein the second signaling is used to determine a second time-frequency resource group, and the second time-frequency resource group is reserved for a second bit block; and transmits the first bit block and the second bit block in the second time-frequency resource group, or transmits only the second bit block among the first bit block and the second bit block in the second time-frequency resource group; wherein time domain resource(s) occupied by the first time-frequency resource group and time domain resource(s) occupied by the second time-frequency resource group are non-orthogonal; a timing relationship between the first signaling and the second signaling is used to determine whether the first bit block is transmitted in the second time-frequency resource group.

In one embodiment, the UE 450 comprises: a memory in which a computer-readable instruction program is stored, wherein the computer-readable instruction program generates an action when executed by at least one processor. The action includes: receiving a first signaling, wherein the first signaling is used to determine a first time-frequency resource group, and the first time-frequency resource group is reserved for a first bit block; receiving a second signaling, wherein the second signaling is used to determine a second time-frequency resource group, and the second time-frequency resource group is reserved for a second bit block; and transmitting the first bit block and the second bit block in the second time-frequency resource group, or transmitting only the second bit block among the first bit block and the second bit block in the second time-frequency resource group; wherein time domain resource(s) occupied by the first time-frequency resource group and time domain resource(s) occupied by the second time-frequency resource group are non-orthogonal; a timing relationship between the first signaling and the second signaling is used to determine whether the first bit block is transmitted in the second time-frequency resource group.

In one embodiment, the gNB 410 device comprises: at least one processor and at least one memory, wherein the at least one memory includes a computer program code; the at least one memory and the computer program code are used together with the at least one processor. The gNB 410 device at least: transmits a first signaling, wherein the first signaling is used to determine a first time-frequency resource group, and the first time-frequency resource group is reserved for a first bit block; transmits a second signaling, wherein the second signaling is used to determine a second time-frequency resource group, and the second time-frequency resource group is reserved for a second bit block; and receives the first bit block and the second bit block in the second time-frequency resource group, or receives only the second bit block among the first bit block and the second bit block in the second time-frequency resource group; wherein time domain resource(s) occupied by the first time-frequency resource group and time domain resource(s) occupied by the second time-frequency resource group are non-orthogonal; a timing relationship between the first signaling and the second signaling is used to determine whether the first bit block is transmitted in the second time-frequency resource group.

In one embodiment, the gNB 410 comprises: a memory in which a computer-readable instruction program is stored, wherein the computer-readable instruction program generates an action when executed by at least one processor. The action includes: transmitting a first signaling, wherein the first signaling is used to determine a first time-frequency resource group, and the first time-frequency resource group is reserved for a first bit block; transmitting a second signaling, wherein the second signaling is used to determine a second time-frequency resource group, and the second time-frequency resource group is reserved for a second bit block; and receiving the first bit block and the second bit block in the second time-frequency resource group, or receiving only the second bit block among the first bit block and the second bit block in the second time-frequency resource group; wherein time domain resource(s) occupied by the first time-frequency resource group and time domain resource(s) occupied by the second time-frequency resource group are non-orthogonal; a timing relationship between the first signaling and the second signaling is used to determine whether the first bit block is transmitted in the second time-frequency resource group.

In one embodiment, the UE 450 corresponds to the user equipment in the disclosure.

In one embodiment, gNB 410 corresponds to the base station in the disclosure.

In one embodiment, at least the former two of the receiver 456, the receiving processor 452, and the controller/processor 490 are used to receive the first signaling in the disclosure.

In one embodiment, at least the former two of the transmitter 416, the transmitting processor 415, and the controller/processor 440 are used to transmit the first signaling in the disclosure.

In one embodiment, at least the former two of the receiver 456, the receiving processor 452, and the controller/processor 490 are used to receive the received second signaling in the disclosure.

In one embodiment, at least the former two of the transmitter 416, the transmitting processor 415, and the controller/processor 440 are used to transmit the received second signaling in the disclosure.

In one embodiment, at least the former two of the receiver 456, the receiving processor 452, and the controller/processor 490 are used to receive the first information in the disclosure.

In one embodiment, at least the former two of the transmitter 416, the transmitting processor 415, and the controller/processor 440 are used to transmit the first information in the disclosure.

In one embodiment, at least the former two of the receiver 456, the receiving processor 452, and the controller/processor 490 are used to receive the second information in the disclosure.

In one embodiment, at least the former two of the transmitter 416, the transmitting processor 415, and the controller/processor 440 are used to transmit the second information in the disclosure.

In one embodiment, at least the former two of the receiver 456, the receiving processor 452, and the controller/processor 490 are used to receive the third information in the disclosure.

In one embodiment, at least the former two of the transmitter 416, the transmitting processor 415, and the controller/processor 440 are used to transmit the third information in the disclosure.

In one embodiment, at least the former two of the receiver 456, the receiving processor 452, and the controller/processor 490 are used to receive the first radio signal in the disclosure.

In one embodiment, at least the former two of the transmitter 416, the transmitting processor 415, and the controller/processor 440 are used to transmit the first radio signal in the disclosure.

In one embodiment, at least the former two of the transmitter 456, the transmitting processor 455, and the controller/processor 490 are used to transmit the first bit block in the disclosure.

In one embodiment, at least the former two of the receiver 416, the receiving processor 412, and the controller/processor 440 are used to receive the first bit block in the disclosure.

In one embodiment, at least the former two of the transmitter 456, the transmitting processor 455, and the controller/processor 490 are used to transmit the second bit block in the disclosure.

In one embodiment, at least the former two of the receiver 416, the receiving processor 412, and the controller/processor 440 are used to receive the second bit block in the disclosure.

Embodiment 5

Figure 5:
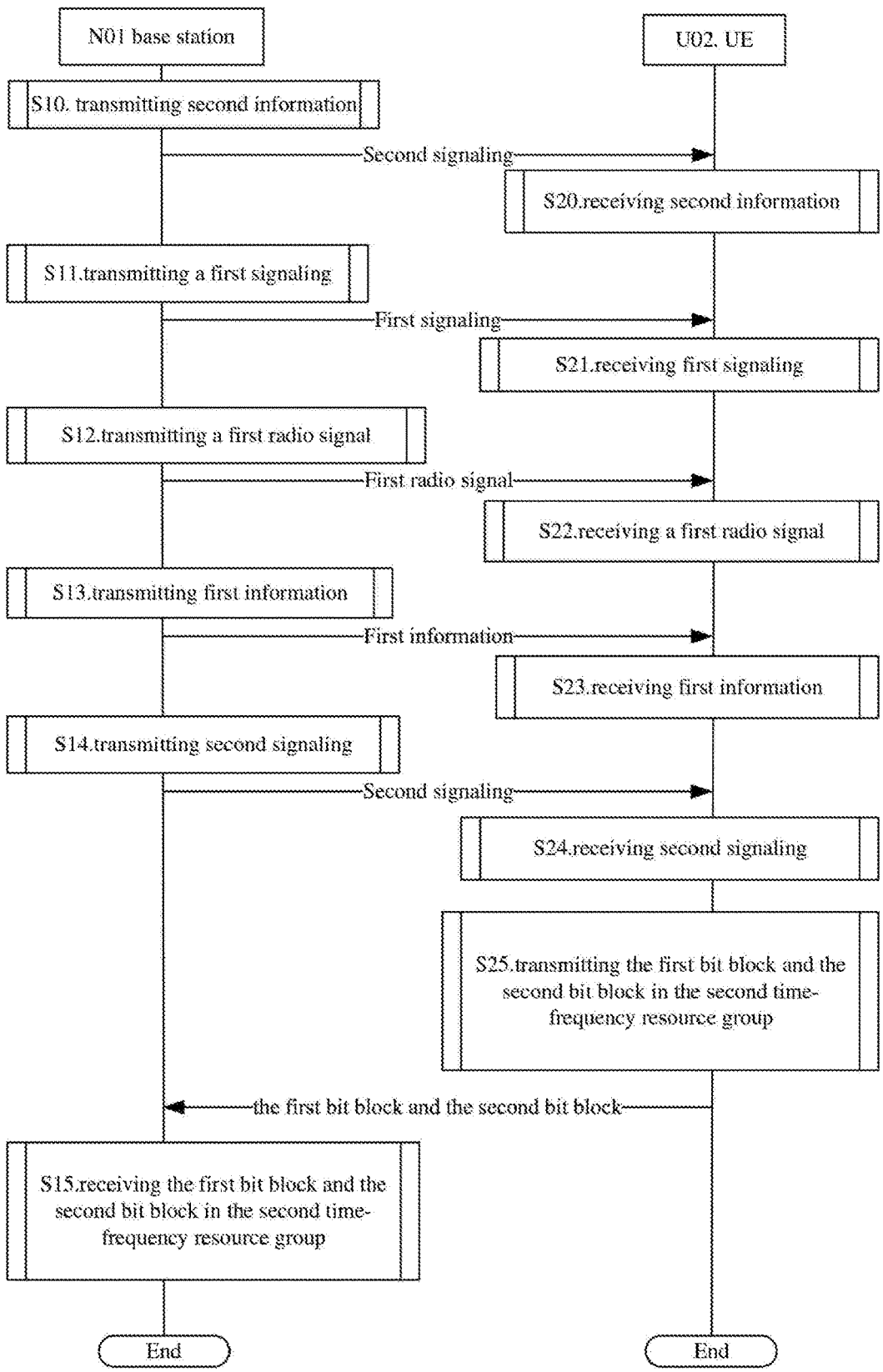
FIG. 5 is a flow diagram illustrating wireless transmission according to one embodiment of the disclosure.

Embodiment 5 illustrates a flow diagram of a wireless transmission, as shown in FIG. 5. In FIG. 5, the base station N01 is a maintenance base station of a serving cell of a user equipment U02.

The N01 transmits the second information in step S10; transmits the first signaling in step S11; transmits the first radio signal in step S12; transmits the first information in step S13; transmits the second signaling in step S14, and receives the first bit block and the second bit block in the second time-frequency resource group in step S15.

The U02 receives the second information in step S20; receives the first signaling in step S21; receives the first radio signal in step S22; receives the first information in step S23; receives the second signaling in step S24, and transmits the first bit block and the second bit block in the second time-frequency resource group in step S25.

In Embodiment 5, the first signaling is used by the U02 to determine a first time-frequency resource group, the first time-frequency resource group is reserved for a first bit block; the second signaling is used by the U02 to determine a second time-frequency resource group, the second time-frequency resource group is reserved for a second bit block; time domain resource(s) occupied by the first time-frequency resource group and time domain resource(s) occupied by the second time-frequency resource group are non-orthogonal; and a timing relationship between the first signaling and the second signaling is used by the U02 to determine whether the first bit block is transmitted in the second time-frequency resource group. The first bit block is transmitted in the second time-frequency resource group, the second signaling comprises a first field, the first field included in the second signaling is used to indicate a first parameter from a first parameter set, the first parameter is used by the U02 to determine a number of time-frequency resource(s) occupied by the first bit block in the second time-frequency resource group; the first parameter belongs to the first parameter set, the first parameter set is one of Y candidate parameter sets, any one of the Y candidate parameter sets comprises a positive integer number of positive real numbers, and the Y is a positive integer. The first information is used to indicate the first parameter set. The second information is used to indicate N time-frequency resource group sets, the N is a positive integer greater than 1, the first time-frequency resource group is a time-frequency resource group in a first time-frequency resource group set, and the first time-frequency resource group set is a time-frequency resource group set of the N time-frequency resource group sets; a number of bit(s) included in the first bit block is used to determine the first time-frequency resource group set of the N time-frequency resource group sets.

In one embodiment, the start time for transmission of the first signaling is earlier than the start time for transmission of the second signaling, and the first bit block and the second bit block are transmitted in the second time-frequency resource group In one embodiment, when a start time for transmission of the first signaling is earlier than the start time for transmission of the second signaling, the first bit block and the second bit block are transmitted in the second time-frequency resource group; when the start time for transmission of the first signaling is later than the start time for transmission of the second signaling, only the second bit block among the first bit block and the second bit block is transmitted in the second time-frequency resource group.

In one embodiment, the Y is greater than 1, at least one of the Y candidate parameter sets comprises at least one positive real number less than 1, and each positive real number in at least one of the Y candidate parameter sets is not less than 1.

In one embodiment, the Y is greater than 1, the second signaling carries a second identifier, and the second identifier is used to determine the first parameter set in the Y candidate parameter sets.

In one embodiment, the Y is greater than 1, and time-frequency resource(s) occupied by the second signaling is(are) used to determine the first parameter set in the Y candidate parameter sets.

In one embodiment, the Y is equal to 1.

In one embodiment, the Y is greater than 1.

In one embodiment, the first radio signal comprises data.

In one embodiment, the first radio signal comprises data and a DMRS.

In one embodiment, the data included in the first radio signal is downlink data.

In one embodiment, the transmission channel of the first radio signal is a Downlink Shared Channel (DL-SCH).

In one embodiment, the first radio signal is transmitted on a downlink physical layer data channel (i.e., a downlink channel that can be used to carry physical layer data).

In one sub-embodiment of the above embodiment, the downlink physical layer data channel is a PDSCH.

In one sub-embodiment of the above embodiment, the downlink physical layer data channel is an sPDSCH.

In one sub-embodiment of the above embodiment, the downlink physical layer data channel is an NR-PDSCH.

In one sub-embodiment of the above embodiment, the downlink physical layer data channel is an NB-PDSCH.

In one embodiment, the first bit block explicitly indicates whether the first radio signal is correctly received.

In one embodiment, the first bit block implicitly indicates whether the first radio signal is correctly received.

In one embodiment, the first bit block carries a Hybrid Automatic Repeat reQuest ACKnowledgement (HARQ-ACK) feedback for the first radio signal.

In one embodiment, some bits of the first bit block carry the HARQ-ACK feedback for the first radio signal.

In one embodiment, all bits of the first bit block carry the HARQ-ACK feedback for the first radio signal.

In one embodiment, the first information is semi-statically configured.

In one embodiment, the first information is carried by higher layer signaling.

In one embodiment, the first information is carried by Radio Resource Control (RRC) signaling.

In one embodiment, the first information comprises one or more Information Elements (IEs) in one RRC signaling.

In one embodiment, the first information comprises all or a part of an IE in one RRC signaling.

In one embodiment, the first information comprises a plurality of IEs in one RRC signaling.

In one embodiment, the first information explicitly indicates the first parameter set.

In one embodiment, the first information implicitly indicates the first parameter set.

In one embodiment, the first information is used to indicate the Y candidate parameter sets.

In one sub-embodiment of the above embodiment, the first information explicitly indicates the Y candidate parameter sets.

In one sub-embodiment of the above embodiment, the first information implicitly indicates the Y candidate parameter sets.

In one embodiment, the second information is semi-statically configured.

In one embodiment, the second information is carried by higher layer signaling.

In one embodiment, the second information is carried by RRC signaling.

In one embodiment, the second information comprises one or more IEs in one RRC signaling.

In one embodiment, the second information comprises all or a part of an IE in one RRC signaling.

In one embodiment, the second information comprises a plurality of IEs in one RRC signaling.

In one embodiment, the second information explicitly indicates N time-frequency resource group sets.

In one embodiment, the second information implicitly indicates N time-frequency resource group sets.

In one embodiment, each time-frequency resource group set in the N time-frequency resource group sets comprises a positive integer number of time-frequency resource groups, and the second information comprises configuration information of each time-frequency resource group in the N time-frequency resource group sets.

In one embodiment, the given time-frequency resource group set is one time-frequency resource group set in the N time-frequency resource group sets, and the given time-frequency resource group set comprises a positive integer number of time-frequency resource groups; the given time-frequency resource group is one time-frequency resource group in the given time-frequency resource group set.

In one sub-embodiment of the above embodiment, the configuration information of the given time-frequency resource group comprises at least one of the occupied time domain resource(s), the occupied code domain resource(s), the occupied frequency domain resource(s), and the corresponding antenna port group.

In one sub-embodiment of the above embodiment, the configuration information of the given time-frequency resource group comprises the occupied time domain resource(s), the occupied code domain resource(s), the occupied frequency domain resource(s), and the corresponding antenna port group.

In one sub-embodiment of the above embodiment, the configuration information of the given time-frequency resource group comprises the occupied initial multi-carrier symbol, a number of occupied multi-carrier symbols, the initial Physical Resource Block (PRB) prior to the frequency hopping or having no frequency hopping, the initial PRB subsequent to frequency hopping, a number of occupied PRBs, frequency hopping setting, Cyclic Shift (CS), Orthogonal Cover Code (OCC), OCC length, the corresponding antenna port group and maximum code rate.

In one sub-embodiment of the above embodiment, the configuration information of the given time-frequency resource group comprises at least one of the occupied initial multi-carrier symbol, a number of occupied multi-carrier symbols, the initial PRB prior to the frequency hopping or having no frequency hopping, the initial PRB subsequent to frequency hopping, a number of occupied PRBs, frequency hopping setting, CS, OCC, OCC length, the corresponding antenna port group and maximum code rate.

In one embodiment, the N time-frequency resource group sets are N PUCCH resource sets, respectively, and the specific definition of the PUCCH resource sets is described in section 9.2.1 of 3GPP TS 38.213.

In one embodiment, the N time-frequency resource group sets correspond to N load size range(s), respectively.

In one embodiment, the N time-frequency resource group sets correspond to N bit number range(s), respectively.

In one sub-embodiment of the above embodiment, the N is equal to 4, the N bit number range(s) is(are) [1, 2], [2, N2],

[N2, N3], and [N3, 1706], respectively, and the N2 and the N3 are configured by higher layer signaling.

In one sub-embodiment of the above embodiment, the N is equal to 4, the N bit number range(s) is(are) [1, 2], [2, N2], [N2, N3], and [N3, 1706], respectively, and the N2 and the N3 are configured by higher layer signaling.

In one embodiment, the first parameter is a positive real number in the first parameter set.

In one embodiment, the first field included in the second signaling explicitly indicates the first parameter from a first parameter set.

In one embodiment, the first field included in the second signaling implicitly indicates the first parameter from a first parameter set.

In one embodiment, the first parameter set comprises a positive real number less than 1.

In one embodiment, the first parameter set comprises at least one positive real number less than 1.

In one embodiment, any positive real number in the first parameter set is not less than 1.

Embodiment 6

Figure 6:
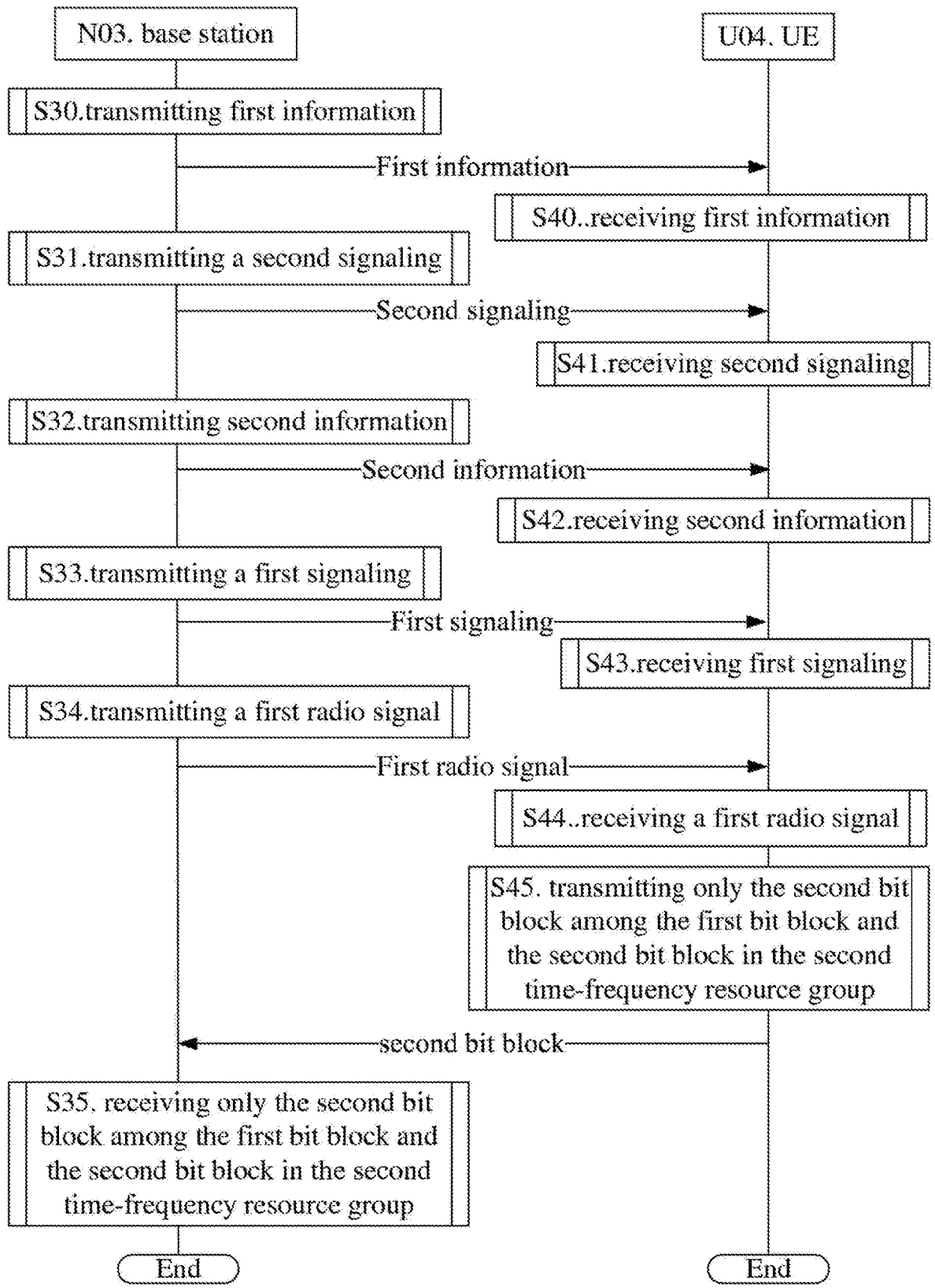
FIG. 6 is a flow diagram illustrating wireless transmission according to another embodiment of the disclosure.

Embodiment 6 illustrates a flow diagram of wireless transmission, as shown in FIG. 6. In FIG. 6, the base station N03 is a maintenance base station of a serving cell of a user equipment U04.

The N03 transmits the first information in step S30; transmits the second signaling in step S31; transmits the second information in step S32; transmits the first signaling in step S33; transmits the first radio signal in step S34; and receives only the second bit block among the first bit block and the second bit block in the second time-frequency resource group in step S35.

The U04 receives the first information in step S40; receives the second signaling in step S41; receives the second information in step S42; receives the first signaling in step S43; receives the first radio signal in step S44; and transmits only the second bit block among the first bit block and the second bit block in the second time-frequency resource group in step S45.

In Embodiment 6, the first signaling is used by the U04 to determine a first time-frequency resource group, the first time-frequency resource group is reserved for a first bit block; the second signaling is used by the U04 to determine a second time-frequency resource group, the second time-frequency resource group is reserved for a second bit block; time domain resource(s) occupied by the first time-frequency resource group and time domain resource(s) occupied by the second time-frequency resource group are non-orthogonal; and a timing relationship between the first signaling and the second signaling is used by the U04 to determine whether the first bit block is transmitted in the second time-frequency resource group. The first signaling is further used to indicate scheduling information of the first radio signal, and the first bit block is used to indicate whether the first radio signal is correctly received. The first bit block is transmitted in the second time-frequency resource group, the second signaling comprises a first field, the first field included in the second signaling is used to indicate a first parameter from a first parameter set, the first parameter is used by the U04 to determine a number of time-frequency resource(s) occupied by the first bit block in the second time-frequency resource group; the first parameter belongs to the first parameter set, the first parameter set is one of Y candidate parameter sets, any one of the Y candidate parameter sets comprises a positive integer number of positive real numbers, and the Y is a positive integer. The first information is used to indicate the first parameter set. The second information is used to indicate N time-frequency resource group sets, the N is a positive integer greater than 1, the first time-frequency resource group is a time-frequency resource group in a first time-frequency resource group set, and the first time-frequency resource group set is a time-frequency resource group set of the N time-frequency resource group sets; a number of bit(s) included in the first bit block is used to determine the first time-frequency resource group set of the N time-frequency resource group sets.

In one embodiment, the start time for transmission of the first signaling is later than the start time for transmission of the second signaling, and only the second bit block among the first bit block and the second bit block is transmitted in the second time-frequency resource group.

In one embodiment, when a start time for transmission of the first signaling is earlier than a start time for transmission of the second signaling, the first bit block and the second bit block are transmitted in the second time-frequency resource group; when the start time for transmission of the first signaling is later than the start time for transmission of the second signaling, only the second bit block among the first bit block and the second bit block is transmitted in the second time-frequency resource group.

Embodiment 7

Figure 7:
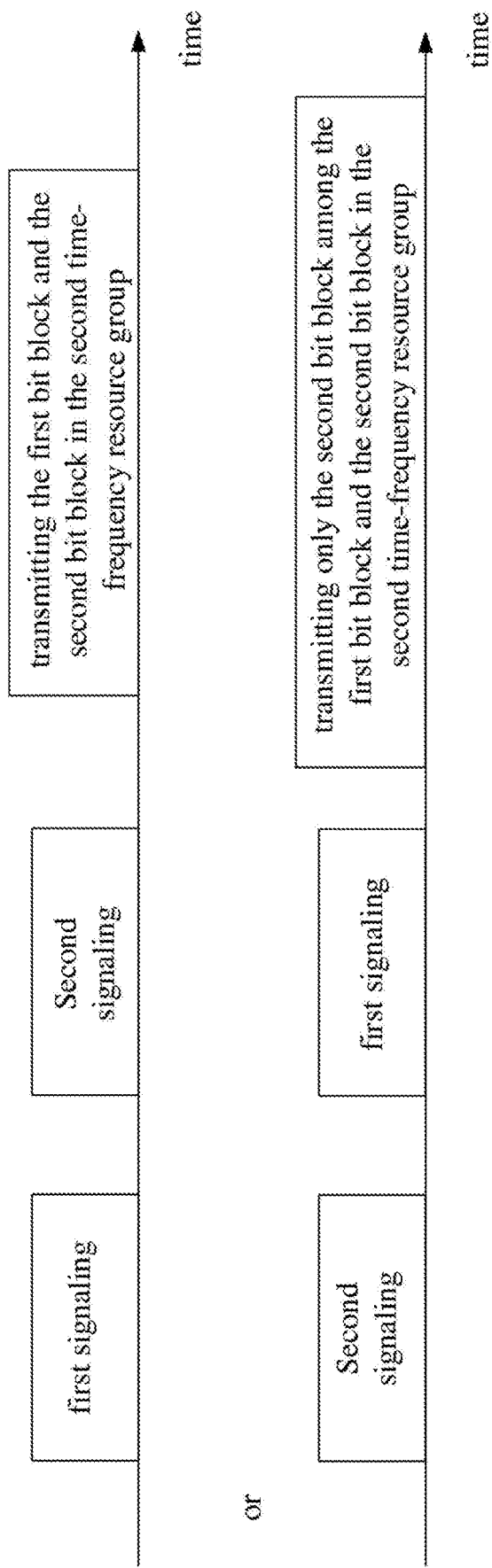
FIG. 7 is a schematic diagram illustrating a timing relationship between first signaling and second signaling used to determine whether a first bit block is transmitted in a second time-frequency resource group according to one embodiment of the disclosure.

Embodiment 7 is a schematic diagram illustrating a timing relationship between first signaling and second signaling used to determine whether a first bit block is transmitted in a second time-frequency resource group, as shown in FIG. 7.

In Embodiment 7, when a start time for transmission of the first signaling is earlier than the start time for transmission of the second signaling, the first bit block and the second bit block are transmitted in the second time-frequency resource group; when the start time for transmission of the first signaling is later than the start time for transmission of the second signaling, only the second bit block among the first bit block and the second bit block is transmitted in the second time-frequency resource group.

In one embodiment, the start time for transmission of the first signaling is earlier than the start time for transmission of the second signaling, and the first bit block and the second bit block are transmitted in the second time-frequency resource group.

In one embodiment, the start time for transmission of the first signaling is later than the start time for transmission initial transmission time of the second signaling, only the second bit block among the first bit block and the second bit block is transmitted in the second time-frequency resource group.

Embodiment 8

Figure 8:
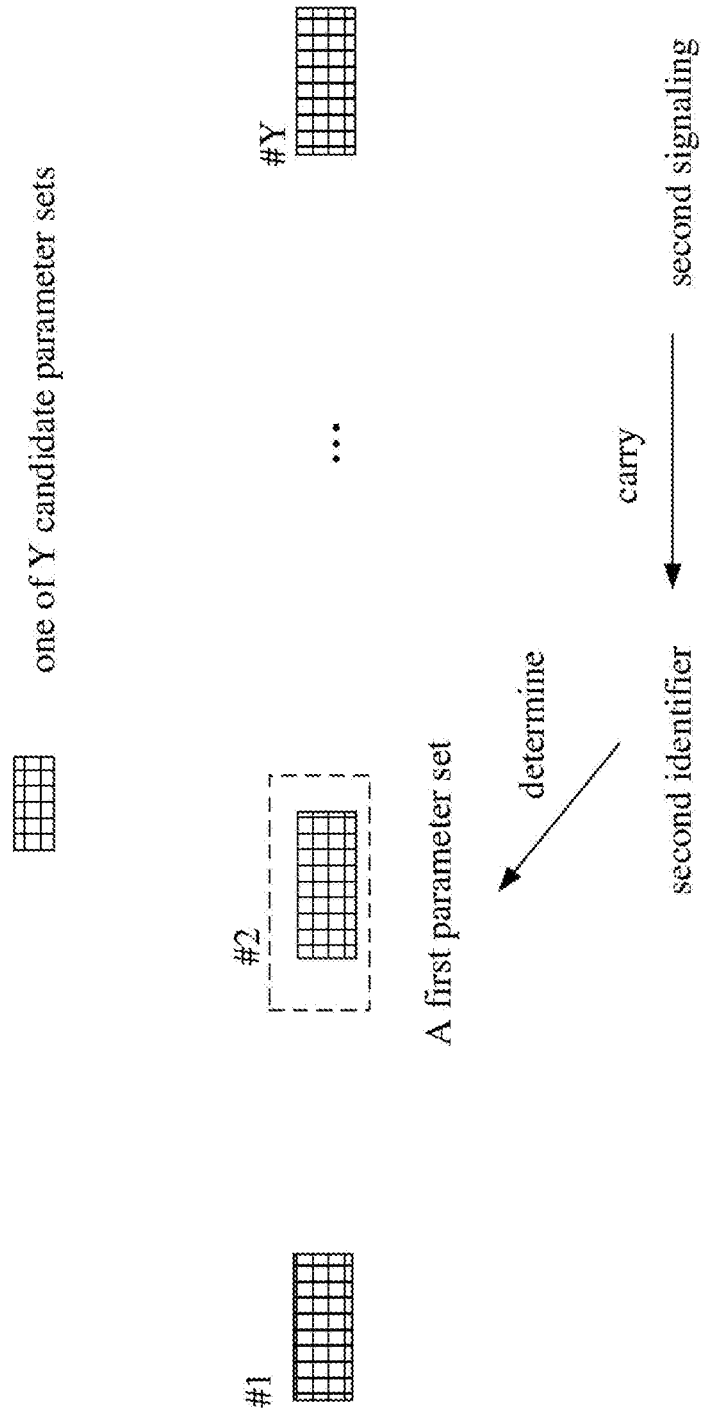
FIG. 8 is a schematic diagram illustrating determining a first parameter set in Y candidate parameter sets according to one embodiment of the disclosure.

Embodiment 8 is a schematic diagram illustrating determining a first parameter set in Y candidate parameter sets, as shown in FIG. 8.

In Embodiment 8, the Y is greater than 1, the second signaling in the disclosure carries a second identifier, and the second identifier is used to determine the first parameter set in the Y candidate parameter sets.

In one embodiment, the second identifier corresponds to the first parameter set in the Y candidate parameter sets.

In one embodiment, the second identifier only corresponds to the first parameter set in the Y candidate parameter sets.

In one embodiment, any one of the T identifier(s) corresponds to at least one candidate parameter set of the Y candidate parameter sets, and any one of the Y candidate parameter sets corresponds to at least one of the T identifier(s), the second identifier is one of the T identifier(s), and the T is a positive integer greater than 1.

In one sub-embodiment of the above embodiment, the second identifier corresponds to the first parameter set in the Y candidate parameter sets.

In one sub-embodiment of the above embodiment, the second identifier only corresponds to the first parameter set in the Y candidate parameter sets.

In one sub-embodiment of the above embodiment, the T identifier(s) is(are) all signaling identifiers.

In one sub-embodiment of the above embodiment, the T identifier(s) is(are) all non-negative integers.

In one sub-embodiment of the above embodiment, the first identifier is one of the T identifier(s).

In one sub-embodiment of the above embodiment, the T identifier(s) is(are) all DCI signaling identifiers.

In one sub-embodiment of the above embodiment, an RS sequence of a DMRS of a DCI signaling is generated by one of the T identifier(s).

In one sub-embodiment of the above embodiment, a CRC bit sequence of a DCI signaling is scrambled by one corresponding identifier of the T identifier(s).

In one sub-embodiment of the above embodiment, a DCI signaling carries one of the T identifier(s).

In one sub-embodiment of the above embodiment, any two of the T identifier(s) are different.

In one sub-embodiment of the above embodiment, the T identifier(s) is(are) all RNTIs.

In one sub-embodiment of the above embodiment, the T identifier(s) comprise(s) at least one of a C-RNTI, a CS-RNTI, and a new-RNTI, and the specific definition of the new-RNTI is described in section 5.1.3.1 of 3GPP TS38.214.

Embodiment 9

Figure 9:
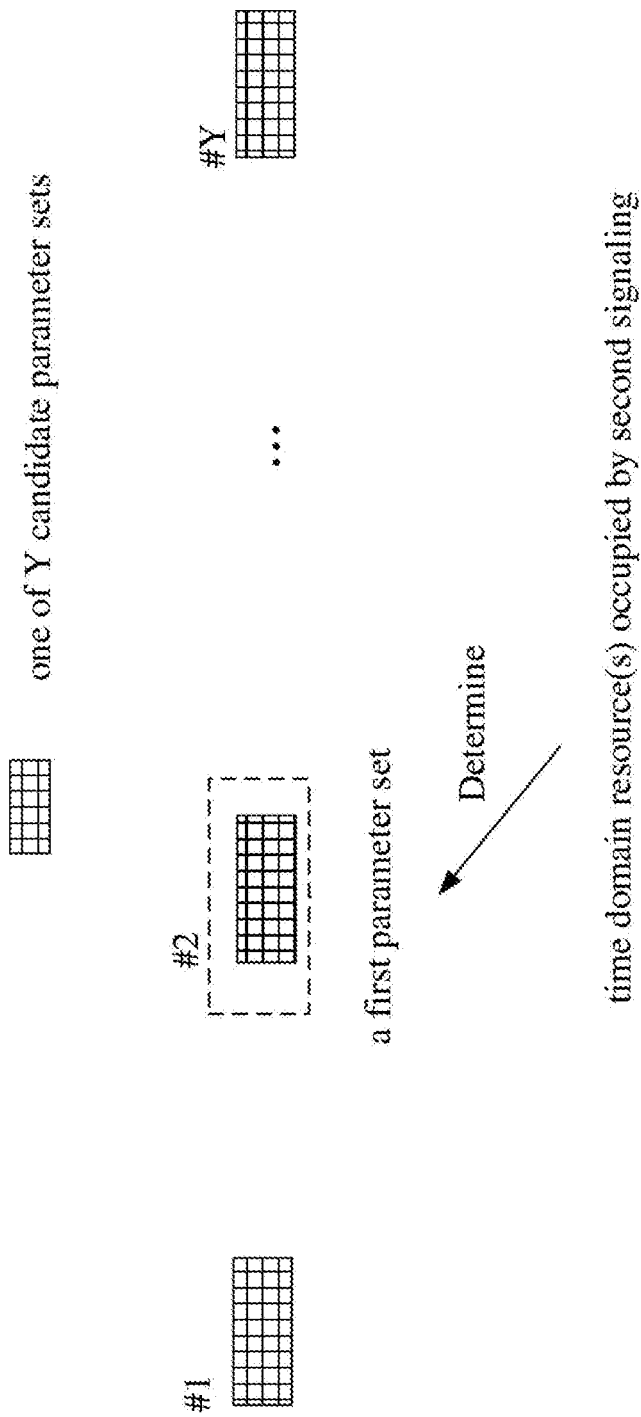
FIG. 9 is a schematic diagram illustrating determining a first parameter set in Y candidate parameter sets according to another embodiment of the disclosure.

Embodiment 9 is another schematic diagram illustrating determining a first parameter set in Y candidate parameter sets, as shown in FIG. 9.

In Embodiment 9, the Y is greater than 1, and time-frequency resource(s) occupied by the second signaling in the disclosure is(are) used to determine the first parameter set in the Y candidate parameter sets.

In one embodiment, the time-frequency resource(s) occupied by the second signaling correspond(s) to the first parameter set in the Y candidate parameter sets.

In one embodiment, the time-frequency resource(s) occupied by the second signaling only correspond(s) to the first parameter set in the Y candidate parameter sets.

In one embodiment, any one of the S time-frequency resource group(s) corresponds to at least one of the Y candidate parameter sets, and any one of the Y candidate parameter sets corresponds to at least one of the S time-frequency resource group(s), the time-frequency resource(s) occupied by the second signaling belong(s) to one of the S time-frequency resource group(s), and the S is a positive integer greater than 1.

In one sub-embodiment of the above embodiment, one of the S time-frequency resource group(s) to which the time-frequency resource(s) occupied by the second signaling belongs corresponds to the first parameter set of the Y candidate parameter sets.

In one sub-embodiment of the above embodiment, one of the S time-frequency resource group(s) to which the time-frequency resource(s) occupied by the second signaling belongs only corresponds to the first parameter set of the Y candidate parameter sets.

In one sub-embodiment of the above embodiment, the time-frequency resource(s) occupied by any two of the S time-frequency resource group(s) is(are) orthogonal (non-overlapping).

In one sub-embodiment of the above embodiment, the S time-frequency resource group(s) comprise(s) S COntrol REsource SETs (CORESETs), and one CORESET comprises a positive integer number of search space, respectively.

In one sub-embodiment of the above embodiment, the S time-frequency resource group(s) comprise(s) S search space set(s), and any one of the S search space set(s) comprises a positive integer number of search space, respectively.

In one sub-embodiment of the above embodiment, the S time-frequency resource group(s) comprise(s) S PDCCH candidate set(s), respectively, and any one of the S PDCCH candidate sets comprises a positive integer number of PDCCH candidates.

Embodiment 10

Figure 10:
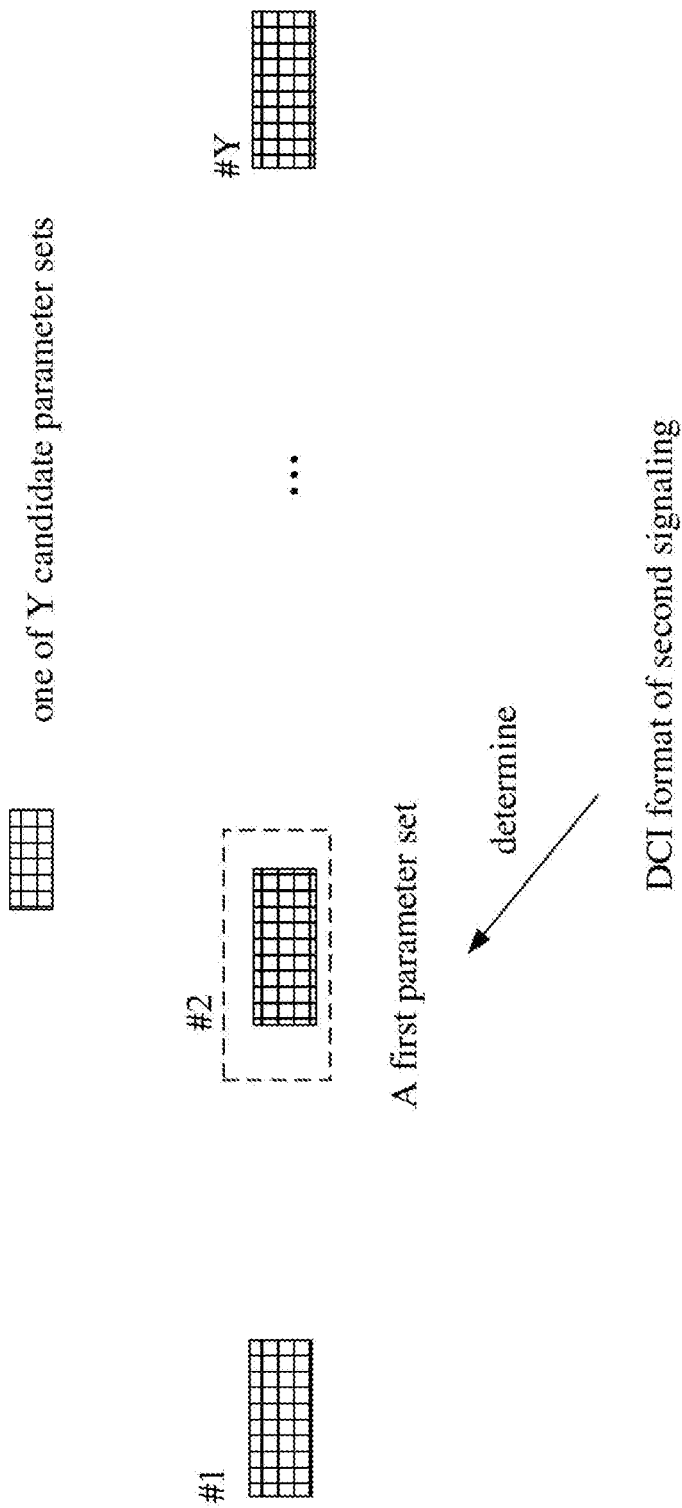
FIG. 10 is a schematic diagram illustrating determining a first parameter set in Y candidate parameter sets according to another embodiment of the disclosure; FIG.

Embodiment 10 is another schematic diagram illustrating determining a first parameter set in the Y candidate parameter sets, as shown in FIG. 10.

In Embodiment 10, the Y is greater than 1, and the DCI format of the second signaling in the disclosure is used to determine the first parameter set in the Y candidate parameter sets.

In one embodiment, the DCI format of the second signaling corresponds to the first parameter set in the Y candidate parameter sets.

In one embodiment, the DCI format of the second signaling only corresponds to the first parameter set in the Y candidate parameter sets.

In one embodiment, any of the V DCI formats corresponds to at least one of the Y candidate parameter sets, any one of the Y candidate parameter sets corresponds to at least one of the V DCI formats, the DCI format of the second signaling belongs to one of the V DCI formats, and the V is a positive integer.

In one sub-embodiment of the above embodiment, one of the V DCI formats to which the DCI format of the second signaling belongs corresponds to the first parameter set in the Y candidate parameter sets.

In one sub-embodiment of the above embodiment, one of the V DCI formats to which the DCI format of the second signaling belongs only corresponds to the first parameter set in the Y candidate parameter sets.

Embodiment 11

Figure 11:
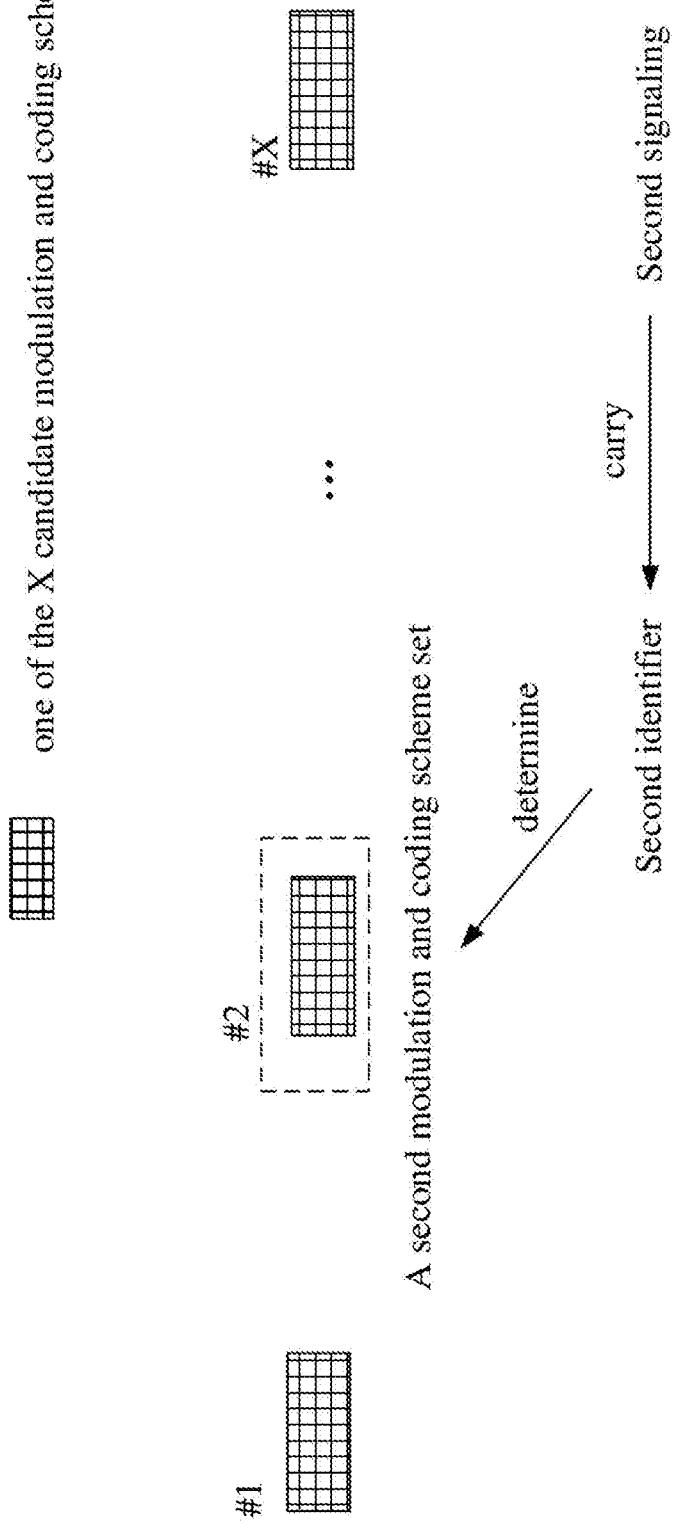
FIG. 11 is a schematic diagram illustrating a relationship between a second identifier and a second modulation and coding scheme set according to one embodiment of the disclosure.

Embodiment 11 is a schematic diagram illustrating a relationship between a second identifier and a second modulation and coding scheme set, as shown in FIG. 11.

In the embodiment 11, the second signaling in the disclosure carries the second identifier, the second signaling is further used to indicate, in the second modulation and coding scheme set, a modulation and coding scheme used when the second bit block in the disclosure is transmitted, the second modulation and coding scheme set is one of the X candidate modulation and coding scheme set(s), the second identifier is also used to determine the second modulation and coding scheme set in the X candidate modulation and coding scheme set(s), and the X is a positive integer greater than 1.

In one embodiment, the target BLER of the second modulation and coding scheme set is equal to 0.1.

In one embodiment, the target BLER of the second modulation and coding scheme set is less than 0.1.

In one embodiment, any one of the X candidate modulation and coding scheme set(s) comprises a positive integer number of modulation and coding schemes (MCS).

In one embodiment, the second identifier corresponds to the second modulation and coding scheme set in the X candidate modulation and coding scheme set(s).

In one embodiment, the second identifier only corresponds to the second modulation and coding scheme set in the X candidate modulation and coding scheme set(s).

In one embodiment, the second signaling comprises a fourth field, and the fourth field included in the second signaling is used to indicate, in the second modulation and coding scheme set, a modulation and coding scheme used when the second bit block is transmitted.

In one sub-embodiment of the above embodiment, the fourth field included in the second signaling comprises a positive integer number of bits.

In one sub-embodiment of the above embodiment, the fourth field included in the second signaling explicitly indicates, in the second modulation and coding scheme set, a modulation and coding scheme used when the second bit block is transmitted.

In one sub-embodiment of the above embodiment, the fourth field included in the second signaling implicitly indicates, in the second modulation and coding scheme set, a modulation and coding scheme when the second bit block is transmitted.

In one sub-embodiment of the above embodiment, the fourth field included in the second signaling is a modulation and coding scheme, and the specific definition of the modulation and coding scheme is described in section 7.3.1.1.1 of 3GPP TS38.212.

In one sub-embodiment of the above embodiment, the fourth field included in the second signaling is a modulation and coding scheme, and the specific definition of the modulation and coding scheme is described in section 7.3.1.1.2 of 3GPP TS38.212.

In one embodiment, the second identifier is a signaling identifier.

In one embodiment, the second identifier is a non-negative integer.

In one embodiment, the second identifier is a signaling identifier of the second signaling.

In one embodiment, the second signaling is a DCI signaling identified by the second identifier.

In one embodiment, the second identifier is used to generate an RS sequence of the DMRS of the second signaling.

In one embodiment, the CRC bit sequence of the second signaling is scrambled by the second identifier.

In one embodiment, the second signaling carries the second identifier.

In one embodiment, the second identifier is a Radio Network Temporary Identifier (RNTI).

In one embodiment, the second identifier is one of Cell (C)-Radio Network Temporary Identifier (RNTI), Configured Scheduling (CS)-RNTI, and new-RNTI. The specific definition of the new-RNTI is described in section 5.1.3.1 of 3GPP TS38.214.

In one embodiment, the second identifier is a new-RNTI, and the specific definition of the new-RNTI is described in section 5.1.3.1 of 3GPP TS38.214.

In one embodiment, the second identifier is a C-RNTI.

In one embodiment, the second identifier is a CS-RNTI.

Embodiment 12

Figure 12:
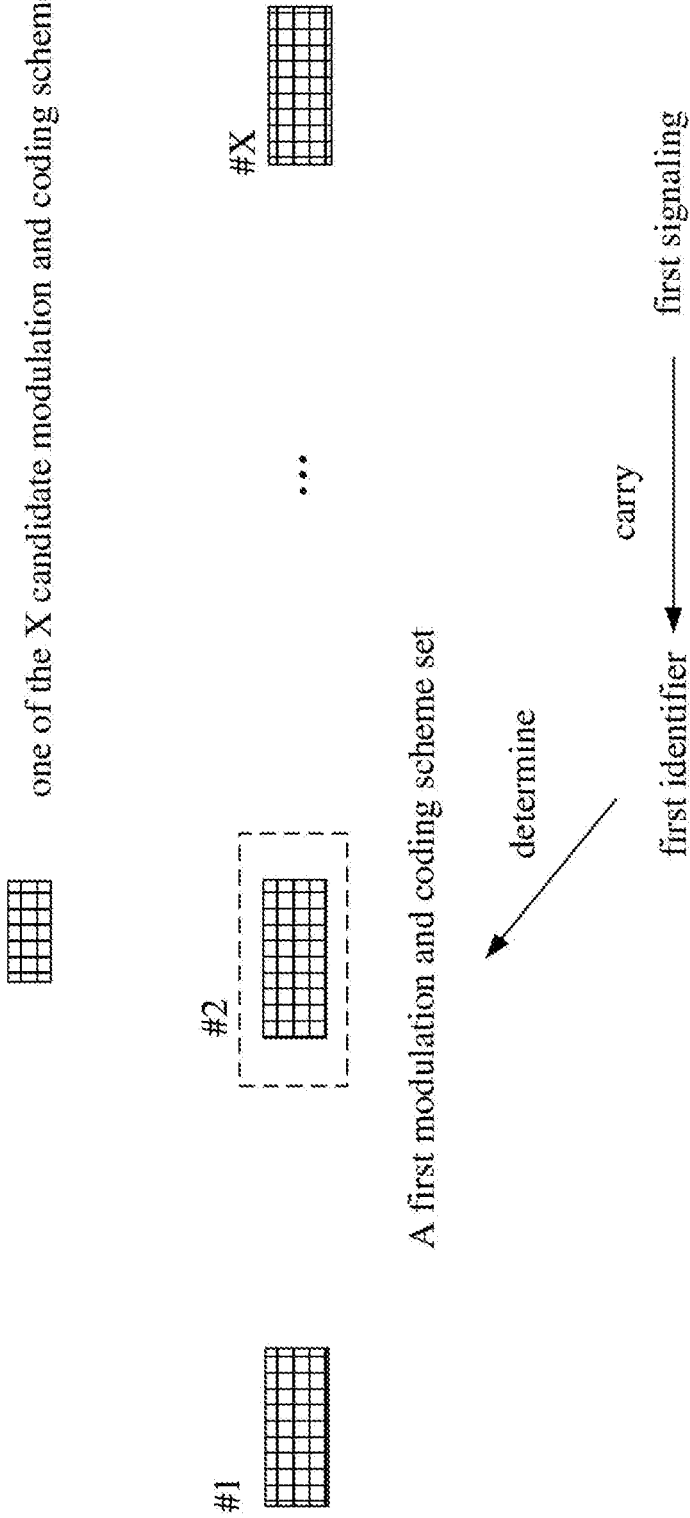
FIG. 12 is a schematic diagram illustrating a relationship between a first identifier and a first modulation and coding scheme set according to one embodiment of the disclosure.

Embodiment 12 is a schematic diagram illustrating a relationship between a first identifier and a first modulation coding scheme set, as shown in FIG. 12.

In Embodiment 12, the first signaling in the disclosure carries a first identifier, and the first signaling is further used to indicate, in the first modulation and coding scheme set, a modulation and coding scheme used by the first radio signal in the disclosure, the first modulation and coding scheme set is one of the X candidate modulation and coding scheme set(s), the first identifier is used to determine the first modulation and coding scheme set in the X candidate modulation and coding scheme set(s), and the X is a positive integer greater than 1.

In one embodiment, the target BLER of the first modulation and coding scheme set is equal to 0.1.

In one embodiment, the target BLER of the first modulation and coding scheme set is less than 0.1.

In one embodiment, any one of the X candidate modulation and coding scheme set(s) comprises a positive integer number of modulation and coding schemes.

In one embodiment, the first identifier corresponds to the first modulation and coding scheme set in the X candidate modulation and coding scheme set(s).

In one embodiment, the first identifier only corresponds to the first modulation and coding scheme set in the X candidate modulation and coding scheme set(s).

In one embodiment, the first identifier is a signaling identifier.

In one embodiment, the first identification is a non-negative integer.

In one embodiment, the first identifier is a signaling identifier of the first signaling.

In one embodiment, the first signaling is a DCI signaling identified by the first identifier.

In one embodiment, the first identifier is used to generate a Reference Signal (RS) sequence of DeModulation Reference Signals (DMRS) of the first signaling.

In one embodiment, the Cyclic Redundancy Check (CRC) bit sequence of the first signaling is scrambled by the first identifier.

In one embodiment, the first identifier is a Radio Network Temporary Identifier (RNTI).

In one embodiment, the first identifier is one of Cell (C)-Radio Network Temporary Identifier (RNTI), Configured Scheduling (CS)-RNTI, and new-RNTI. The specific definition of the new-RNTI is described in section 5.1.3.1 of 3GPP TS38.214.

In one embodiment, the first identifier is a C-RNTI.

In one embodiment, the first identifier is a CS-RNTI.

In one embodiment, the first identifier is a new-RNTI, and the specific definition of the new-RNTI is described in section 5.1.3.1 of 3GPP TS38.214.

Embodiment 13

Embodiment 13 is a schematic diagram illustrating a relationship between a first identifier and a second identifier, as shown in FIG. 13.

In Embodiment 13, the second identifier is the same as the first identifier, or the second identifier is different from the first identifier.

In one embodiment, the second identifier is the same as the first identifier.

In one embodiment, the second identifier is different from the first identifier.

In one embodiment, the first identifier is a C-RNTI or a CS-RNTI, and the second identifier is a new-RNTI.

In one sub-embodiment of the above embodiment, the first identifier is a C-RNTI.

In one sub-embodiment of the above embodiment, the first identifier is a CS-RNTI.

In one embodiment, the first identifier is a new-RNTI, and the second identifier is a new-RNTI.

In one embodiment, the first identifier is a new-RNTI, and the second identifier is a C-RNTI or a CS-RNTI.

In one sub-embodiment of the above embodiment, the second identifier is a C-RNTI.

In one sub-embodiment of the above embodiment, the second identifier is a CS-RNTI.

In one embodiment, the first identifier is a C-RNTI or a CS-RNTI, and the second identifier is a C-RNTI or a CS-RNTI.

In one sub-embodiment of the above embodiment, the first identifier is a C-RNTI.

In one sub-embodiment of the above embodiment, the first identifier is a CS-RNTI.

In one sub-embodiment of the above embodiment, the second identifier is a C-RNTI.

In one sub-embodiment of the above embodiment, the second identifier is a CS-RNTI.

In one embodiment, the above method further comprises: receiving third information;
wherein the third information is used to indicate the first identifier and the second identifier.

In one sub-embodiment of the above embodiment, the third information is semi-statically configured.

In one sub-embodiment of the above embodiment, the third information is carried by higher layer signaling.

In one sub-embodiment of the above embodiment, the third information is carried by Radio Resource Control (RRC) signaling.

In one sub-embodiment of the above embodiment, the third information comprises one or more Information Elements (IEs) in one RRC signaling.

In one sub-embodiment of the above embodiment, the third information comprises all or a part of an IE in one RRC signaling.

In one sub-embodiment of the above embodiment, the third information comprises an RNTI-Value IE, and the specific definition of the RNTI-Value IE is described in section 6.3.2 of 3GPP TS38.331.

In one sub-embodiment of the above embodiment, the third information comprises a plurality of IEs in one RRC signaling.

In one sub-embodiment of the above embodiment, the third information explicitly indicates the first identifier and the second identifier.

In one sub-embodiment of the above embodiment, the third information implicitly indicates the first identifier and the second identifier.

Embodiment 14

Figure 14:
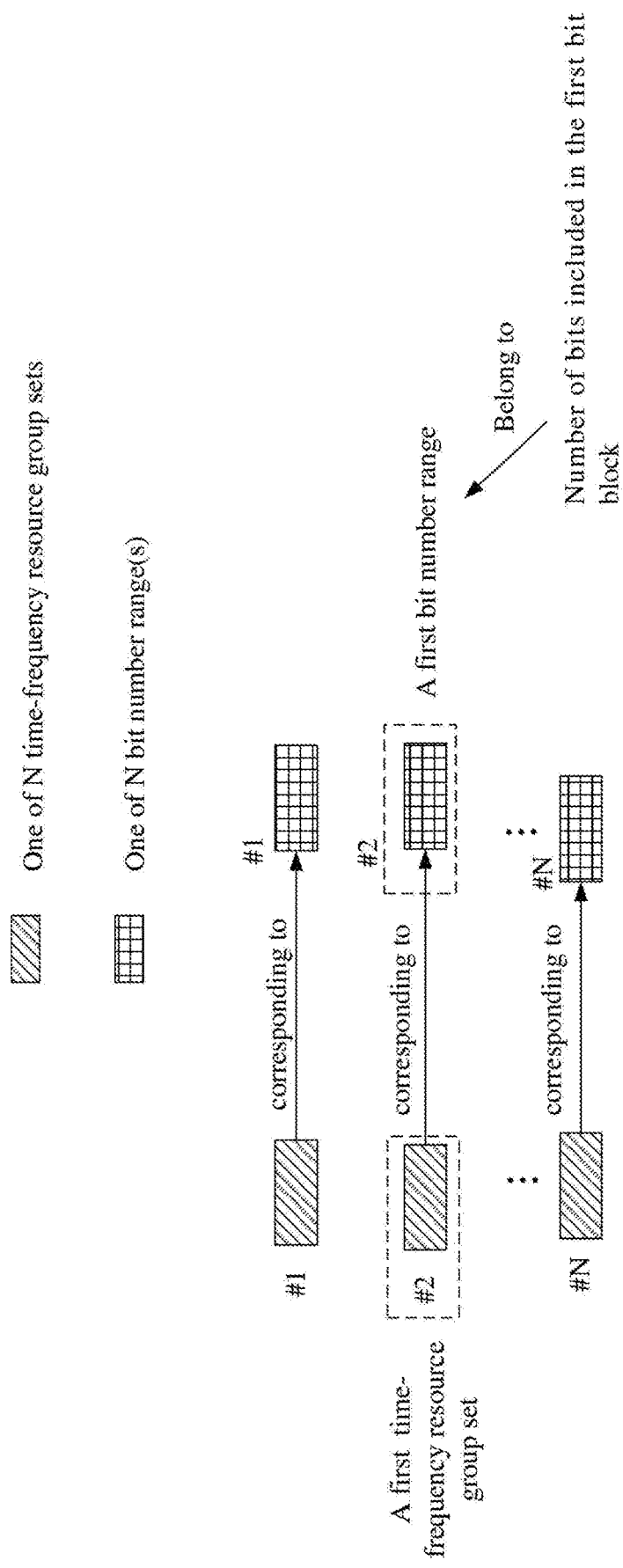
FIG. 14 is a schematic diagram illustrating a number of bit(s) of a first bit block used to determine a first time-frequency resource group set from N time-frequency resource group sets according to one embodiment of the disclosure.

Embodiment 14 is a schematic diagram illustrating a number of bit(s) included in a first bit block used to determine a first time-frequency resource group set from N time-frequency resource group sets, as shown in FIG. 14.

In Embodiment 14, the N time-frequency resource group sets correspond to N bit number range(s), respectively, a number of bit(s) included in a first bit block belongs to a first bit number range, the first bit number range is one of the N bit number range(s), the first time-frequency resource group set is one of the N time-frequency resource group sets corresponding to the first bit number range.

In one embodiment, any one of the N bit number range(s) comprises a positive integer number of positive integers.

In one embodiment, any two of the N bit number range(s) are different.

In one embodiment, any two of the N bit number range(s) does not comprise an identical integer.

Embodiment 15

Figure 15:
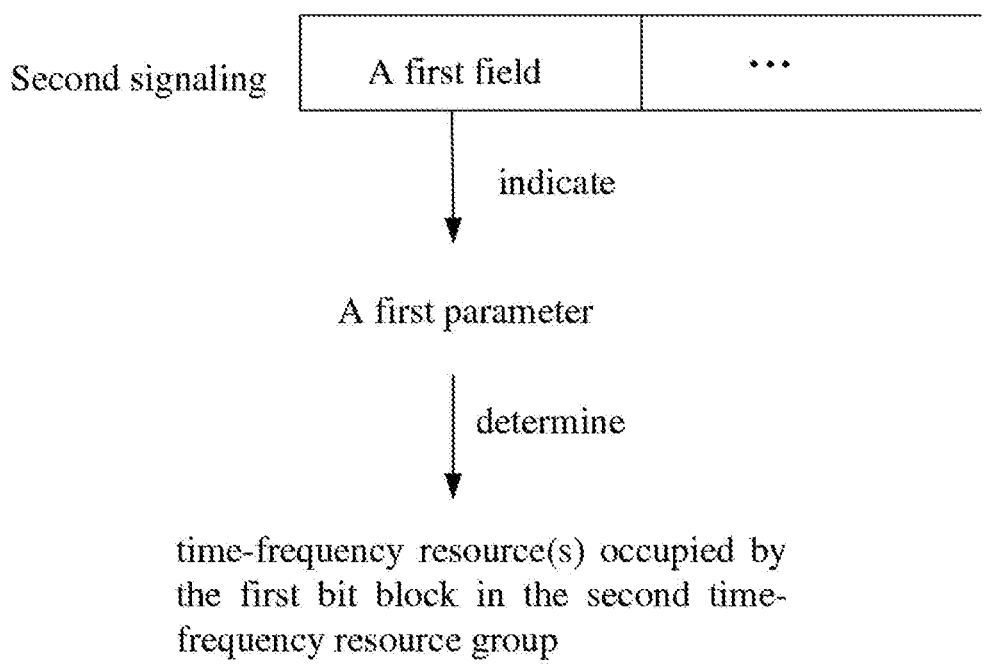
FIG. 15 is a schematic diagram illustrating determining a number of time-frequency resource(s) occupied by a first bit block in a second time-frequency resource group according to one embodiment of the disclosure.

Embodiment 15 is a schematic diagram illustrating determining a number of time-frequency resource(s) occupied by a first bit block in a second time-frequency resource group, as shown in FIG. 15.

In Embodiment 15, the first bit block is transmitted in the second time-frequency resource group, the second signaling in the disclosure comprises a first field, the first field included in the second signaling is used to indicate a first parameter from the first parameter set in the disclosure, and the first parameter is used to determine a number of time-frequency resource(s) occupied by the first bit block in the second time-frequency resource group.

In one embodiment, a number of time-frequency resource(s) occupied by the first bit block in the second time-frequency resource group is related to the first parameter.

In one embodiment, a number of time-frequency resource(s) occupied by the first bit block in the second time-frequency resource group is linearly related to the first parameter.

In one embodiment, the first parameter is an offset of a number of time-frequency resource(s) occupied by each bit in the first bit block in the second time-frequency resource group with respect to a number of time-frequency resource(s) occupied by each bit in the second bit block in the disclosure in the second time-frequency resource group.

In one embodiment, the first parameter is an offset of a number of Resource Elements (REs) occupied by each bit in the first bit block with respect to a number of REs occupied by each bit in the second bit block in the disclosure.

In one embodiment, the first parameter is an offset of a number of time-frequency resource(s) occupied by each bit in the first bit block in the second time-frequency resource group with respect to a number of time-frequency resource(s) occupied by each bit in the second bit block in the disclosure in the second time-frequency resource group.

In one embodiment, the first parameter is an offset of a number of Resource Elements (REs) occupied by each bit in the first bit block with respect to a number of REs occupied by each bit in the second bit block in the disclosure.

In one embodiment, the first parameter is $\beta_{offset}^{PUSCH}$, and the specific definition of the $\beta_{offset}^{PUSCH}$ is described in TS36.213 and TS36.212.

In one embodiment, the first parameter is $\beta_{offset}^{PUSCH}$, and the specific definition of the $\beta_{offset}^{PUSCH}$ is described in section 6.3.2.4.1.1 and section 6.3.2.4.2.1 of TS38.212.

In one embodiment, the first parameter is $\beta_{offset}^{PUSCH}$, a number of time-frequency resource(s) occupied by the first bit block in the second time-frequency resource group is $O'_{ACK}$, the formula of the $O'_{ACK}$ is related to the above $\beta_{offset}^{PUSCH}$, and the formula of the $O'_{ACK}$ is described in section 6.3.2.4.1.1 and section 6.3.2.4.2.1 of TS38.212.

Embodiment 16

Figure 16:
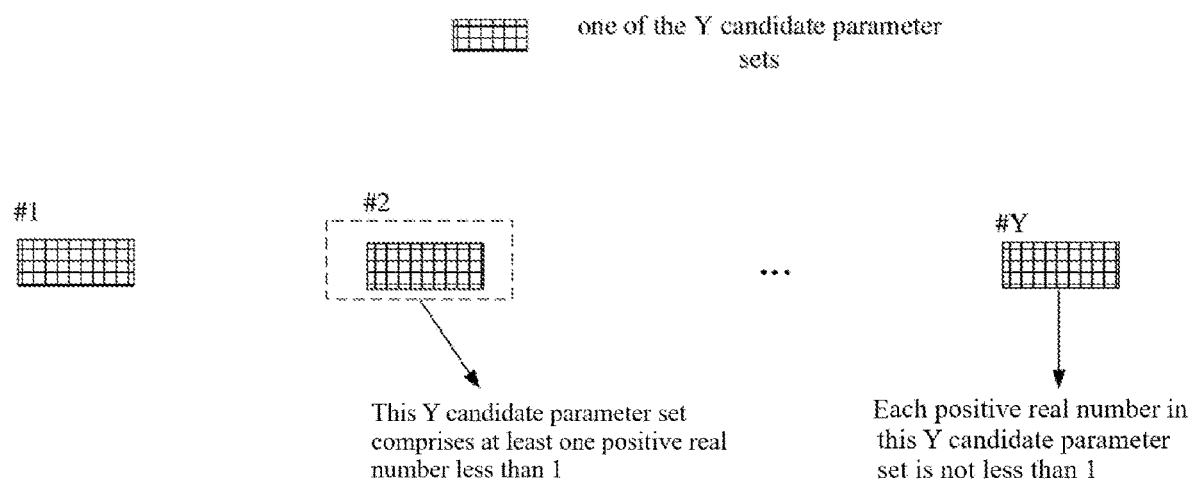
FIG. 16 is a schematic diagram illustrating Y candidate parameter sets according to one embodiment of the disclosure.

Embodiment 16 is a schematic diagram illustrating Y candidate parameter sets, as shown in FIG. 16.

In Embodiment 16, the Y is greater than 1, at least one of the Y candidate parameter sets comprises at least one positive real number less than 1, and each positive real number in at least one of the Y candidate parameter sets is not less than 1.

Embodiment 17

Figure 17:
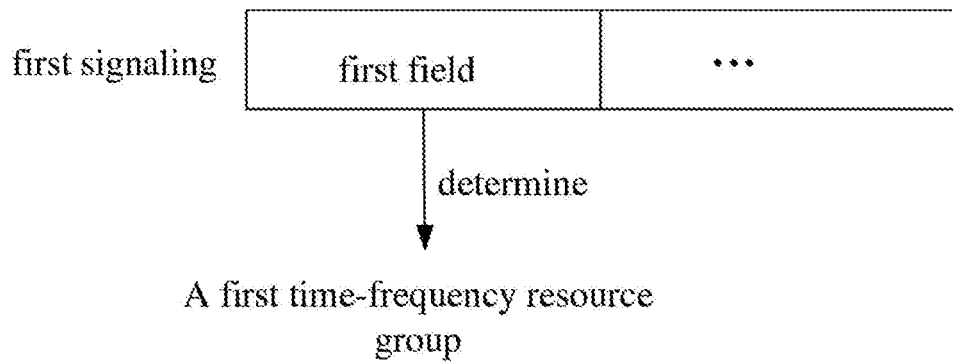
FIG. 17 is a schematic diagram illustrating first signaling according to one embodiment of the disclosure.

Embodiment 17 is a schematic diagram illustrating first signaling, as shown in FIG. 17.

In Embodiment 17, the first signaling comprises a first field, and the first field included in the first signaling is used to determine the first time-frequency resource group in the disclosure.

In one embodiment, the first field included in the first signaling comprises a positive integer number of bits.

In one embodiment, the first field included in the first signaling explicitly indicates the first time-frequency resource group.

In one embodiment, the first field included in the first signaling implicitly indicates the first time-frequency resource group.

In one embodiment, the first field included in the first signaling is used to determine the first time-frequency resource group from the first time-frequency resource group set, and the first time-frequency resource group set comprises a positive integer number of time-frequency resource groups.

In one embodiment, the first field included in the first signaling indicates an index of the first time-frequency resource group in a first time-frequency resource group set, and the first time-frequency resource group set comprises a positive integer number of time-frequency resource groups.

In one embodiment, the first field included in the first signaling is a PUCCH resource indicator, and the specific definition of the PUCCH resource indicator is described in section 9.2.3 of 3GPP TS 38.213.

Embodiment 18

Figure 18:
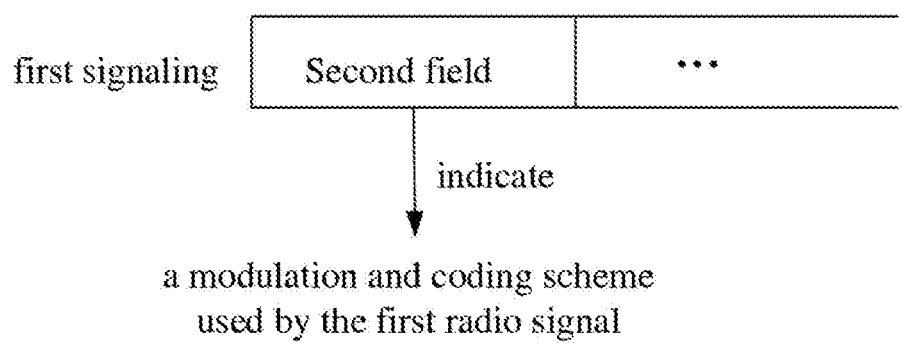
FIG. 18 is a schematic diagram illustrating first signaling according to another embodiment of the disclosure; FIG.

Embodiment 18 is a schematic diagram illustrating another first signaling, as shown in FIG. 18.

In Embodiment 18, the first signaling comprises a second field, and the second field included in the first signaling is used to indicate, in the first modulation and coding scheme set in the disclosure, the modulation and coding scheme used by the first radio signal in the disclosure.

In one embodiment, the first modulation and coding scheme set comprises a positive integer number of modulation and coding schemes (MCS).

In one embodiment, the second field included in the first signaling comprises a positive integer number of bits.

In one embodiment, the second field included in the first signaling explicitly indicates, in the first modulation and coding scheme set, the modulation and coding scheme used by the first radio signal.

In one embodiment, the second field included in the first signaling implicitly indicates, in the first modulation and coding scheme set, the modulation and coding scheme used by the first radio signal.

In one embodiment, the second field included in the first signaling indicates an index of the modulation and coding scheme used by the first radio signal in the first modulation and coding scheme set.

In one embodiment, the second field included in the first signaling is a modulation and coding scheme, and the specific definition of the modulation and coding scheme is described in section 5.1.3 of 3GPP TS38.214.

Embodiment 19

Figure 19:
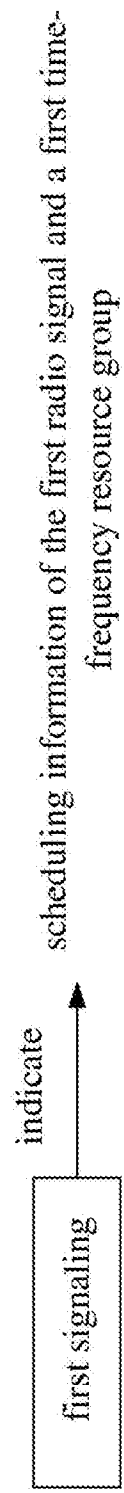
FIG. 19 is a schematic diagram illustrating first signaling according to another embodiment of the disclosure.

Embodiment 19 is a schematic diagram illustrating another first signaling, as shown in FIG. 19.

In Embodiment 19, the first signaling is used to indicate scheduling information of the first radio signal and the first time-frequency resource group in the disclosure.

In one embodiment, the first signaling explicitly indicates scheduling information of the first radio signal.

In one embodiment, the first signaling implicitly indicates scheduling information of the first radio signal.

In one embodiment, the first signaling explicitly indicates the first time-frequency resource group.

In one embodiment, the first signaling implicitly indicates the first time-frequency resource group.

In one embodiment, the scheduling information of the first radio signal comprises at least one of occupied time domain resource(s), occupied frequency domain resource(s), the Modulation and Coding Scheme (MCS), configuration information of DeModulation Reference Signals (DMRS), a Hybrid Automatic Repeat reQuest (HARD) process number, a Redundancy Version (RV), a New Data Indicator (NDI), a transmitting antenna port, a corresponding multi-antenna related transmission and a corresponding multi-antenna related reception.

In one sub-embodiment of the above embodiment, the MCS included in the scheduling information of the first radio signal is a modulation and coding scheme used by the first radio signal.

In one sub-embodiment of the above embodiment, the configuration information of the DMRS included in the scheduling information of the first radio signal comprises at least one of a Reference Signal (RS) sequence, a mapping scheme, a DMRS type, occupied time domain resource(s), occupied frequency domain resource(s), occupied code domain resource(s), a cyclic shift, and an Orthogonal Cover Code (OCC).

In one embodiment, the multi-antenna related reception is spatial Rx parameters.

In one embodiment, the multi-antenna related reception is a receiving beam.

In one embodiment, the multi-antenna related reception is a receiving beamforming matrix.

In one embodiment, the multi-antenna related reception is a receiving analog beamforming matrix.

In one embodiment, the multi-antenna related reception is a receiving analog beamforming vector.

In one embodiment, the multi-antenna related reception is a receiving beamforming vector.

In one embodiment, the multi-antenna related reception is receiving spatial filtering.

In one embodiment, the multi-antenna related transmission is spatial Tx parameters.

In one embodiment, the multi-antenna related transmission is a transmitting beam.

In one embodiment, the multi-antenna related transmission is a transmitting beamforming matrix.

In one embodiment, the multi-antenna related transmission is a transmitting analog beamforming matrix.

In one embodiment, the multi-antenna related transmission is a transmitting analog beamforming vector.

In one embodiment, the multi-antenna related transmission is a transmitting beamforming vector.

In one embodiment, the multi-antenna related transmission is transmitting spatial filtering.

In one embodiment, the spatial Tx parameters comprise one or more of a transmitting antenna port, a transmitting antenna port group, a transmitting beam, a transmitting analog beamforming matrix, a transmitting analog beamforming vector, a transmitting beamforming matrix, a transmitting beamforming vector and transmitting spatial filtering.

In one embodiment, the spatial Rx parameters comprise one or more of a receiving beam, a receiving analog beamforming matrix, a receiving analog beamforming vector, a receiving beamforming matrix, a receiving beamforming vector, and receiving spatial filtering.

Embodiment 20

Figure 20:
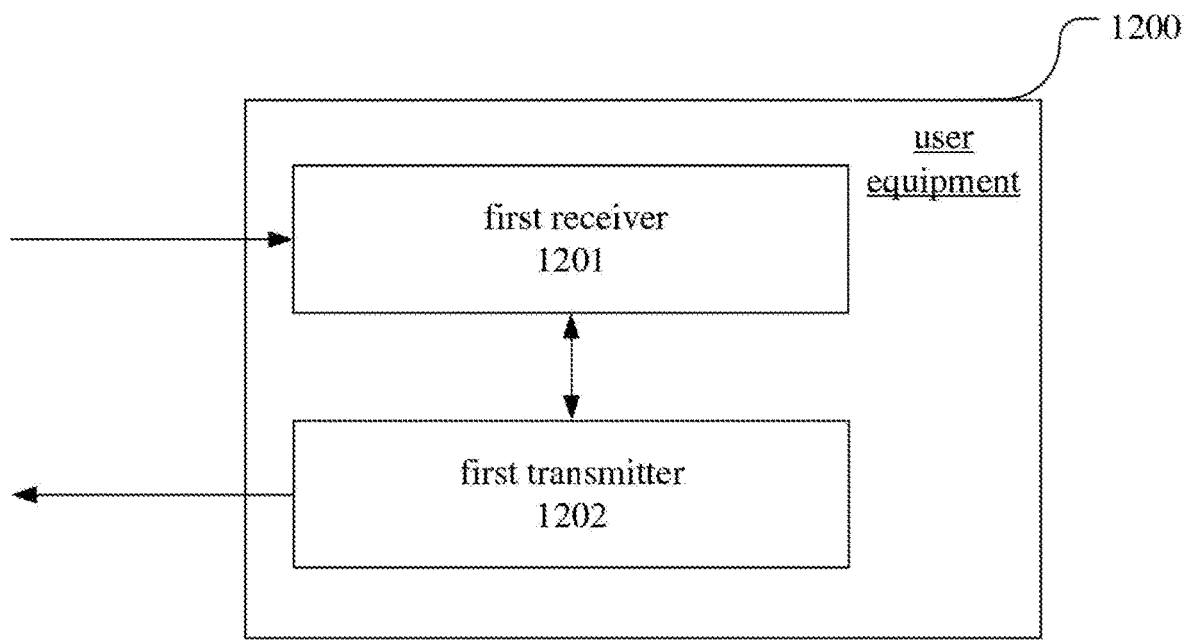
FIG. 20 is a block diagram illustrating the structure of a processing device in UE according to one embodiment of the disclosure.

Embodiment 20 is a block diagram illustrating the structure of a processing device in UE, as shown in FIG. 20. In FIG. 20, the UE processing device 1200 comprises a first receiver 1201 and a first transmitter 1202.

In one embodiment, the first receiver 1201 comprises a receiver 456, a receiving processor 452, and a controller/processor 490 in Embodiment 4.

In one embodiment, the first receiver 1201 comprises at least the former two of the receiver 456, the receiving processor 452, and the controller/processor 490 in Embodiment 4.

In one embodiment, the first transmitter 1202 comprises a transmitter 456, a transmitting processor 455, and a controller/processor 490 in Embodiment 4.

In one embodiment, the first transmitter 1202 comprises at least the former two of the transmitter 456, the transmitting processor 455, and the controller/processor 490 in Embodiment 4.

The first receiver 1201: receives a first signaling, wherein the first signaling is used to determine a first time-frequency resource group, and the first time-frequency resource group is reserved for a first bit block; and receives a second signaling, wherein the second signaling is used to determine a second time-frequency resource group, and the second time-frequency resource group is reserved for a second bit block;

the first transmitter 1202: transmits the first bit block and the second bit block in the second time-frequency resource group, or transmits only the second bit block among the first bit block and the second bit block in the second time-frequency resource group.

In Embodiment 20, time domain resource(s) occupied by the first time-frequency resource group and time domain resource(s) occupied by the second time-frequency resource group are non-orthogonal; a timing relationship between the first signaling and the second signaling is used to determine whether the first bit block is transmitted in the second time-frequency resource group.

In one embodiment, when a start time for transmission of the first signaling is earlier than a start time for transmission of the second signaling, the first bit block and the second bit block are transmitted in the second time-frequency resource group; when the start time for transmission of the first signaling is later than the start time for transmission of the second signaling, only the second bit block among the first bit block and the second bit block is transmitted in the second time-frequency resource group.

In one embodiment, the first receiver 1201 further receives a first radio signal; wherein the first signaling is further used to indicate scheduling information of the first radio signal, and the first bit block is used to indicate whether the first radio signal is correctly received.

In one embodiment, the first bit block is transmitted in the second time-frequency resource group, the second signaling comprises a first field, the first field included in the second signaling is used to indicate a first parameter from a first parameter set, the first parameter is used to determine a number of time-frequency resource(s) occupied by the first bit block in the second time-frequency resource group; the first parameter belongs to the first parameter set, the first parameter set is one of Y candidate parameter sets, any one of the Y candidate parameter sets comprises a positive integer number of positive real numbers, and the Y is a positive integer.

In one embodiment, the Y is greater than 1, at least one of the Y candidate parameter sets comprises at least one positive real number less than 1, and each positive real number in at least one of the Y candidate parameter sets is not less than 1.

In one embodiment, the Y is greater than 1, the second signaling carries a second identifier, and the second identifier is used to determine the first parameter set in the Y candidate parameter sets.

In one embodiment, the Y is greater than 1, and time-frequency resource(s) occupied by the second signaling is(are) used to determine the first parameter set in the Y candidate parameter sets.

In one embodiment, the first receiver 1201 further receives first information; wherein the first information is used to indicate the first parameter set.

In one embodiment, the first receiver 1201 further receives second information, wherein the second information is used to indicate N time-frequency resource group sets, the N is a positive integer greater than 1, the first time-frequency resource group is a time-frequency resource group in a first time-frequency resource group set, and the first time-frequency resource group set is a time-frequency resource group set of the N time-frequency resource group sets; a number of bit(s) included in the first bit block is used to determine the first time-frequency resource group set of the N time-frequency resource group sets.

Embodiment 21

Figure 21:
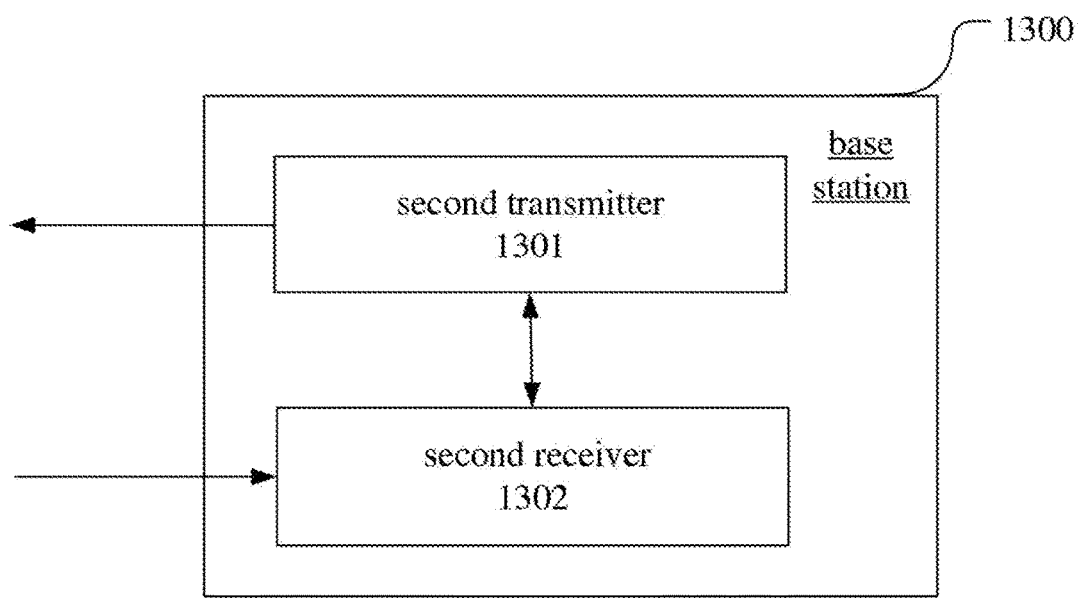
FIG. 21 is a block diagram illustrating the structure of a processing device in a base station according to one embodiment of the disclosure.

Embodiment 21 is a block diagram illustrating the structure of a processing device in a base station, as shown in FIG. 21. In FIG. 21, the processing device 1300 in the base station comprises a second transmitter 1301 and a second receiver 1302.

In one embodiment, the second transmitter 1301 comprises a transmitter 416, a transmitting processor 415, and a controller/processor 440 in Embodiment 4.

In one embodiment, the second transmitter 1301 comprises at least the former two of the transmitter 416, the transmitting processor 415, and the controller/processor 440 in Embodiment 4.

In one embodiment, the second receiver 1302 comprises a receiver 416, a receiving processor 412, and a controller/processor 440 in Embodiment 4.

In one embodiment, the second receiver 1302 comprises at least the former two of the receiver 416, the receiving processor 412, and the controller/processor 440 in Embodiment 4.

The second transmitter 1301 transmits a first signaling, wherein the first signaling is used to determine a first time-frequency resource group, and the first time-frequency resource group is reserved for a first bit block; and transmits a second signaling, wherein the second signaling is used to determine a second time-frequency resource group, and the second time-frequency resource group is reserved for a second bit block;

the second receiver 1302 receives the first bit block and the second bit block in the second time-frequency resource group, or receives only the second bit block among the first bit block and the second bit block in the second time-frequency resource group.

In Embodiment 21, time domain resource(s) occupied by the first time-frequency resource group and time domain resource(s) occupied by the second time-frequency resource group are non-orthogonal; a timing relationship between the first signaling and the second signaling is used to determine whether the first bit block is transmitted in the second time-frequency resource group.

In one embodiment, when the start time for transmission of the first signaling is earlier than the start time for transmission of the second signaling, the first bit block and the second bit block are received in the second time-frequency resource group; when the start time for transmission of the first signaling is later than the start time for transmission of the second signaling, only the second bit block among the first bit block and the second bit block is received in the second time-frequency resource group.

In one embodiment, the second transmitter 1301 further transmits a first radio signal; wherein the first signaling is further used to indicate scheduling information of the first radio signal, and the first bit block is used to indicate whether the first radio signal is correctly received.

In one embodiment, the first bit block is transmitted in the second time-frequency resource group, the second signaling comprises a first field, the first field included in the second signaling is used to indicate a first parameter from a first parameter set, the first parameter is used to determine a number of time-frequency resource(s) occupied by the first bit block in the second time-frequency resource group; the first parameter belongs to the first parameter set, the first parameter set is one of Y candidate parameter sets, any one of the Y candidate parameter sets comprises a positive integer number of positive real numbers, and the Y is a positive integer.

In one embodiment, the Y is greater than 1, at least one of the Y candidate parameter sets comprises at least one positive real number less than 1, and each positive real number in at least one of the Y candidate parameter sets is not less than 1.

In one embodiment, the Y is greater than 1, the second signaling carries a second identifier, and the second identifier is used to determine the first parameter set in the Y candidate parameter sets.

In one embodiment, the Y is greater than 1, and time-frequency resource(s) occupied by the second signaling is(are) used to determine the first parameter set in the Y candidate parameter sets.

In one embodiment, the second transmitter 1301 further transmits first information; wherein the first information is used to indicate the first parameter set.

In one embodiment, the second transmitter 1301 further transmits second information, wherein the second information is used to indicate N time-frequency resource group sets, the N is a positive integer greater than 1, the first time-frequency resource group is a time-frequency resource group in a first time-frequency resource group set, and the first time-frequency resource group set is a time-frequency resource group set of the N time-frequency resource group sets; a number of bit(s) included in the first bit block is used to determine the first time-frequency resource group set of the N time-frequency resource group sets.

One of ordinary skill in the art can appreciate that all or part of the above steps can be completed by a program to instruct related hardware. The program can be stored in a computer-readable storage medium such as a read only memory, a hard disk or an optical disk. Alternatively, all or part of the steps of the above embodiments may also be implemented using one or more integrated circuits. Correspondingly, each module unit in the above embodiment may be implemented in hardware form or in the form of a software function module. The disclosure is not limited to any specific combination of software and hardware. The user equipment, terminal and UE in the disclosure include, but are not limited to, a wireless communication device such as a drone, a communication module on the drone, a remote control aircraft, an aircraft, a small aircraft, a mobile phone, a tablet computer, a notebook, a vehicle communication device, a wireless sensor, an internet card, an Internet of Things terminal, an RFID terminal, an NB-IOT terminal, a Machine Type Communication (MTC) terminal, an enhanced MTC (eMTC) terminal, a data card, an internet card, a vehicle communication device, a low-cost mobile phone, a low-cost tablet computer, etc. The base station or system device in the disclosure includes, but is not limited to, a macro communication base station, a micro cell base station, a home base station, a relay base station, an NR Node B (gNB), a Transmitter Receiver Point (TRP), and other wireless communication devices.

The above is only the preferred embodiment of the disclosure and is not intended to limit the scope of protection the disclosure. Any modifications, equivalents, improvements, etc., which are made within the spirit and principle of the disclosure, are intended to be included within the scope of protection the disclosure.

What is claimed is:

1. A method in a user equipment for wireless communication, comprising:
   receiving a first signaling, wherein the first signaling is used to determine a first time-frequency resource group, and the first time-frequency resource group is reserved for a first bit block;
   receiving a first radio signal;
   receiving a second signaling, wherein the second signaling is used to determine a second time-frequency resource group, and the second time-frequency resource group is reserved for a second bit block; and
   transmitting the first bit block and the second bit block in the second time-frequency resource group, or transmitting only the second bit block among the first bit block and the second bit block in the second time-frequency resource group;
   wherein the first signaling is further used to indicate scheduling information of the first radio signal, and the first bit block is used to indicate whether the first radio signal is correctly received; time domain resource(s) occupied by the first time-frequency resource group and time domain resource(s) occupied by the second time-frequency resource group are non-orthogonal; a timing relationship between the first signaling and the second signaling is used to determine whether the first bit block is transmitted in the second time-frequency resource group; when a start time for transmission of the first signaling is earlier than a start time for transmission of the second signaling, the first bit block and the second bit block are transmitted in the second time-frequency resource group; when the start time for transmission of the first signaling is later than the start time for transmission of the second signaling, only the second bit block among the first bit block and the second bit block is transmitted in the second time-frequency resource group.

2. The method according to claim 1, comprising:

receiving second information, wherein the second information is used to indicate N time-frequency resource group sets, N is a positive integer greater than 1, the first time-frequency resource group is a time-frequency resource group in a first time-frequency resource group set, and the first time-frequency resource group set is a time-frequency resource group set of the N time-frequency resource group sets; a number of bit(s) included in the first bit block is used to determine the first time-frequency resource group set of the N time-frequency resource group sets.

3. The method according to claim 1, wherein the first bit block is transmitted in the second time-frequency resource group, the second signaling comprises a first field, the first field included in the second signaling is used to indicate a first parameter from a first parameter set, the first parameter is used to determine a number of time-frequency resource(s) occupied by the first bit block in the second time-frequency resource group; the first parameter belongs to the first parameter set, the first parameter set is one of Y candidate parameter sets, any one of the Y candidate parameter sets comprises a positive integer number of positive real numbers, and Y is a positive integer; the Y is greater than 1, at least one of the Y candidate parameter sets comprises at least one positive real number less than 1, and each positive real number in at least one of the Y candidate parameter sets is not less than 1.

4. The method according to claim 3, wherein the first bit block is transmitted in the second time-frequency resource group, the second signaling comprises a first field, the first field included in the second signaling is used to indicate a first parameter from a first parameter set, the first parameter is used to determine a number of time-frequency resource(s) occupied by the first bit block in the second time-frequency resource group; the first parameter belongs to the first parameter set, the first parameter set is one of Y candidate parameter sets, any one of the Y candidate parameter sets comprises a positive integer number of positive real numbers, and Y is a positive integer;

the Y is greater than 1, the second signaling carries a second identifier, and the second identifier is used to determine the first parameter set in the Y candidate parameter sets;

or, the Y is greater than 1, and time-frequency resource(s) occupied by the second signaling is(are) used to determine the first parameter set in the Y candidate parameter sets.

5. A method in a base station for wireless communication, comprising:

transmitting a first signaling, wherein the first signaling is used to determine a first time-frequency resource group, and the first time-frequency resource group is reserved for a first bit block;

transmitting a first radio signal;

transmitting a second signaling, wherein the second signaling is used to determine a second time-frequency resource group, and the second time-frequency resource group is reserved for a second bit block; and receiving the first bit block and the second bit block in the second time-frequency resource group, or receiving only the second bit block among the first bit block and the second bit block in the second time-frequency resource group;

wherein the first signaling is further used to indicate scheduling information of the first radio signal, and the first bit block is used to indicate whether the first radio signal is correctly received; time domain resource(s) occupied by the first time-frequency resource group and time domain resource(s) occupied by the second time-frequency resource group are non-orthogonal; a timing relationship between the first signaling and the second signaling is used to determine whether the first bit block is transmitted in the second time-frequency resource group; when a start time for transmission of the first signaling is earlier than a start time for transmission of the second signaling, the first bit block and the second bit block are received in the second time-frequency resource group; when the start time for transmission of the first signaling is later than the start time for transmission of the second signaling, only the second bit block among the first bit block and the second bit block is received in the second time-frequency resource group.

6. The method according to claim 5, comprising:

transmitting second information, wherein the second information is used to indicate N time-frequency resource group sets, N is a positive integer greater than 1, the first time-frequency resource group is a time-frequency resource group in a first time-frequency resource group set, and the first time-frequency resource group set is a time-frequency resource group set of the N time-frequency resource group sets; a number of bit(s) included in the first bit block is used to determine the first time-frequency resource group set of the N time-frequency resource group sets.

7. The method according to claim 5, wherein the first bit block is transmitted in the second time-frequency resource group, the second signaling comprises a first field, the first field included in the second signaling is used to indicate a first parameter from a first parameter set, the first parameter is used to determine a number of time-frequency resource(s) occupied by the first bit block in the second time-frequency resource group; the first parameter belongs to the first parameter set, the first parameter set is one of Y candidate parameter sets, any one of the Y candidate parameter sets comprises a positive integer number of positive real numbers, and Y is a positive integer; the Y is greater than 1, at least one of the Y candidate parameter sets comprises at least one positive real number less than 1, and each positive real number in at least one of the Y candidate parameter sets is not less than 1.

8. The method according to claim 7, wherein the first bit block is transmitted in the second time-frequency resource group, the second signaling comprises a first field, the first field included in the second signaling is used to indicate a first parameter from a first parameter set, the first parameter is used to determine a number of time-frequency resource(s) occupied by the first bit block in the second time-frequency resource group; the first parameter belongs to the first parameter set, the first parameter set is one of Y candidate parameter sets, any one of the Y candidate parameter sets comprises a positive integer number of positive real numbers, and Y is a positive integer;
the Y is greater than 1, the second signaling carries a second identifier, and the second identifier is used to determine the first parameter set in the Y candidate parameter sets;
or, the Y is greater than 1, and time-frequency resource(s) occupied by the second signaling is(are) used to determine the first parameter set in the Y candidate parameter set.

9. A user equipment for wireless communication, comprising:
a first receiver, receiving a first signaling, wherein the first signaling is used to determine a first time-frequency resource group, and the first time-frequency resource group is reserved for a first bit block; receiving a first radio signal; receiving a second signaling, wherein the second signaling is used to determine a second time-frequency resource group, and the second time-frequency resource group is reserved for a second bit block; and
a first transmitter, transmitting the first bit block and the second bit block in the second time-frequency resource group, or transmitting only the second bit block among the first bit block and the second bit block in the second time-frequency resource group;
wherein the first signaling is further used to indicate scheduling information of the first radio signal, and the first bit block is used to indicate whether the first radio signal is correctly received; time domain resource(s) occupied by the first time-frequency resource group and time domain resource(s) occupied by the second time-frequency resource group are non-orthogonal; a timing relationship between the first signaling and the second signaling is used to determine whether the first bit block is transmitted in the second time-frequency resource group; when a start time for transmission of the first signaling is earlier than a start time for transmission of the second signaling, the first bit block and the second bit block are transmitted in the second time-frequency resource group; when the start time for transmission of the first signaling is later than the start time for transmission of the second signaling, only the second bit block among the first bit block and the second bit block is transmitted in the second time-frequency resource group.

10. The user equipment according to claim 9, the first receiver further receives second information, wherein the second information is used to indicate N time-frequency resource group sets, N is a positive integer greater than 1, the first time-frequency resource group is a time-frequency resource group in a first time-frequency resource group set, and the first time-frequency resource group set is a time-frequency resource group set of the N time-frequency resource group sets; a number of bit(s) included in the first bit block is used to determine the first time-frequency resource group set of the N time-frequency resource group sets.

11. The user equipment according to claim 9, wherein the first bit block is transmitted in the second time-frequency resource group, the second signaling comprises a first field, the first field included in the second signaling is used to indicate a first parameter from a first parameter set, the first parameter is used to determine a number of time-frequency resource(s) occupied by the first bit block in the second time-frequency resource group; the first parameter belongs to the first parameter set, the first parameter set is one of Y candidate parameter sets, any one of the Y candidate parameter sets comprises a positive integer number of positive real numbers, and Y is a positive integer; the Y is greater than 1, at least one of the Y candidate parameter sets comprises at least one positive real number less than 1, and each positive real number in at least one of the Y candidate parameter sets is not less than 1.

12. The user equipment according to claim 11, wherein the first bit block is transmitted in the second time-frequency resource group, the second signaling comprises a first field, the first field included in the second signaling is used to indicate a first parameter from a first parameter set, the first parameter is used to determine a number of time-frequency resource(s) occupied by the first bit block in the second time-frequency resource group; the first parameter belongs to the first parameter set, the first parameter set is one of Y candidate parameter sets, any one of the Y candidate parameter sets comprises a positive integer number of positive real numbers, and Y is a positive integer;
the Y is greater than 1, the second signaling carries a second identifier, and the second identifier is used to determine the first parameter set in the Y candidate parameter sets;
or, the Y is greater than 1, and time-frequency resource(s) occupied by the second signaling is(are) used to determine the first parameter set in the Y candidate parameter sets.

13. A base station for wireless communication, comprising:
a second transmitter, transmitting a first signaling, wherein the first signaling is used to determine a first time-frequency resource group, and the first time-frequency resource group is reserved for a first bit block; transmitting a first radio signal; transmitting a second signaling, wherein the second signaling is used to determine a second time-frequency resource group, and the second time-frequency resource group is reserved for a second bit block; and
a second receiver, receiving the first bit block and the second bit block in the second time-frequency resource group, or receiving only the second bit block among the first bit block and the second bit block in the second time-frequency resource group;
wherein the first signaling is further used to indicate scheduling information of the first radio signal, and the first bit block is used to indicate whether the first radio signal is correctly received; time domain resource(s) occupied by the first time-frequency resource group and time domain resource(s) occupied by the second time-frequency resource group are non-orthogonal; a timing relationship between the first signaling and the second signaling is used to determine whether the first bit block is transmitted in the second time-frequency resource group; when a start time for transmission of the first signaling is earlier than a start time for transmission of the second signaling, the first bit block and the second bit block are received in the second time-frequency resource group; when the start time for transmission of the first signaling is later than the start time for transmission of the second signaling, only the second bit block among the first bit block and the second bit block is received in the second time-frequency resource group.

14. The base station according to claim 13, the second transmitter further transmits second information, wherein the second information is used to indicate N time-frequency resource group sets, N is a positive integer greater than 1, the first time-frequency resource group is a time-frequency resource group in a first time-frequency resource group set, and the first time-frequency resource group set is a time-frequency resource group set of the N time-frequency resource group sets; a number of bit(s) included in the first bit block is used to determine the first time-frequency resource group set of the N time-frequency resource group sets.

15. The base station according to claim 13, wherein the first bit block is transmitted in the second time-frequency resource group, the second signaling comprises a first field, the first field included in the second signaling is used to indicate a first parameter from a first parameter set, the first parameter is used to determine a number of time-frequency resource(s) occupied by the first bit block in the second time-frequency resource group; the first parameter belongs to the first parameter set, the first parameter set is one of Y candidate parameter sets, any one of the Y candidate parameter sets comprises a positive integer number of positive real numbers, and Y is a positive integer; the Y is greater than 1, at least one of the Y candidate parameter sets comprises at least one positive real number less than 1, and each positive real number in at least one of the Y candidate parameter sets is not less than 1.

16. The base station according to claim 15, wherein the first bit block is transmitted in the second time-frequency resource group, the second signaling comprises a first field, the first field included in the second signaling is used to indicate a first parameter from a first parameter set, the first parameter is used to determine a number of time-frequency resource(s) occupied by the first bit block in the second time-frequency resource group; the first parameter belongs to the first parameter set, the first parameter set is one of Y candidate parameter sets, any one of the Y candidate parameter sets comprises a positive integer number of positive real numbers, and Y is a positive integer;
the Y is greater than 1, the second signaling carries a second identifier, and the second identifier is used to determine the first parameter set in the Y candidate parameter sets;
the Y is greater than 1, and time-frequency resource(s) occupied by the second signaling is(are) used to determine the first parameter set in the Y candidate parameter sets.

* * * * *